(12) United States Patent
Eberle et al.

(10) Patent No.: US 8,542,691 B2
(45) Date of Patent: Sep. 24, 2013

(54) CLASSES OF SERVICE FOR NETWORK ON CHIPS

(75) Inventors: Hans Eberle, Sunnyvale, CA (US); Wladyslaw Olesinski, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 13/016,924

(22) Filed: Jan. 28, 2011

(65) Prior Publication Data

US 2011/0134933 A1    Jun. 9, 2011

Related U.S. Application Data

(63) Continuation-in-part of application No. 12/495,498, filed on Jun. 30, 2009, now Pat. No. 8,189,578, and a continuation-in-part of application No. 12/982,585, filed on Dec. 30, 2010, now Pat. No. 8,385,358.

(51) Int. Cl.
*H04L 12/56* (2011.01)
(52) U.S. Cl.
USPC ............................ 370/400; 370/412; 370/428
(58) Field of Classification Search
None
See application file for complete search history.

(56) References Cited

U.S. PATENT DOCUMENTS

| | | | | |
|---|---|---|---|---|
| 8,285,900 | B2* | 10/2012 | Gratz et al. | 710/100 |
| 2001/0009552 | A1 | 7/2001 | Parruck et al. | |
| 2007/0115995 | A1* | 5/2007 | Kim et al. | 370/392 |
| 2007/0297435 | A1 | 12/2007 | Bucknell et al. | |
| 2008/0084893 | A1* | 4/2008 | Lee | 370/410 |
| 2009/0201925 | A1* | 8/2009 | Rhim et al. | 370/389 |
| 2009/0323532 | A1* | 12/2009 | Lai | 370/235 |
| 2010/0158023 | A1* | 6/2010 | Mukhopadhyay et al. | 370/401 |
| 2011/0182299 | A1 | 7/2011 | Loeb et al. | |
| 2012/0002678 | A1 | 1/2012 | Jonsson et al. | |

OTHER PUBLICATIONS

Kumar, R., Zyuban, V., Tullsen, D., "Interconnections in Multi-Core Architectures: Understanding Mechanisms, Overheads and Scaling", IEEE, May 2005, 12 pages.

Kumar, S., Jantsch, A., Soininen, J., Forsell, M., Millberg, M., Oberg, J., Tiensyrja, K., Hemani, A., "A Network on Chip Architecture and Design Methodology", IEEE Computer Society, Proceedings of the IEEE Computer Society Annual Symposium on VLSI, Apr. 25-26, 2002, 8 pages.

Kim, J., Balfour, J., Dally, W., "Flattened Butterfly Topology for On-Chip Networks", IEEE Computer Architecture Letters, Jul. 12, 2007, 4 pages.

(Continued)

*Primary Examiner* — Hassan Phillips
*Assistant Examiner* — Duc Duong
(74) *Attorney, Agent, or Firm* — Osha Liang LLP

(57) ABSTRACT

A method includes a local switch receiving a first set of upstream packets and a first set of local packets, each assigned a first class of service. The local switch inserts, according to a first insertion rate, a local packet between subsets of the first set of upstream packets to obtain an ordered set of first class packets. The local switch also receives a second set of upstream packets and a second set of local packets, each assigned a second class. The local switch inserts, according to a second insertion rate, a local packet between subsets of the second set of upstream packets to obtain an ordered set of second class packets. The method includes for each timeslot, selecting a class, and forwarding a packet from the selected class of service to a downstream switch. The switches are interconnected in a daisy chain topology on a single chip.

20 Claims, 20 Drawing Sheets

(56) References Cited

OTHER PUBLICATIONS

Dally, W., Towles, B., "Route Packets, Not Wires: On-Chip Interconnection Networks", DAC 2001, Jun. 18-22, 2001, 6 pages.

Benini, L., De Micheli, G., "Networks on Chips: A New Paradigm for Component-Based MPSoC Design", Jan. 2004, 24 pages.

Shreedhar, M., et al, "Efficient Fair Queuing Using Deficit Round-Robin", IEEE ACM Transactions on Networking, vol. 4, No. 3, Jun. 1, 1996, 11 pages.

Parekh, A., et al, "A Generalized Processor Sharing Approach to Flow Control in Integrated Services Networks: The Single-Node Case", IEEE/ACM Transactions on Networking, vol. 1, No. 3, Jun. 1, 1993, 14 pages.

Chuanxiong, G., "SRR: An O(1) Time Complexity Packet Scheduler for Flows in Multi-Service Packet Networks", SIGCOMM'01, Aug. 27, 2001, 12 pages.

Demers, A., et al. "Analysis and Simulation of a Fair Queueing Algorithm", Internetowrking: Research and Experience, vol. 1, 3-26, Jan. 1, 1990, 24 pages.

Bjerregaard, T. and Mahadevan, S., "A Survey of Research and Practices of Network-on-Chip," ACM Computing Surveys (CSUR), vol. 38, Mar. 2006, 51 pages.

Goossens, K. et al., "AEthereal Network on Chip: Concepts, Architectures, and Implementations," IEEE Design & Test of Computers, vol. 22, Nov. 2005, 8 pages.

Bolotin, E. et al, "QNoC: QoS Architecture and Design Process for Network on Chip," Journal of Systems Architecture, vol. 50, Feb. 2004, 24 pages.

\* cited by examiner

700 Example

702 Key for Example

Key
C1 = Class 1
C2 = Class 2
U = Upstream Packet
L = Local Packet

*Class 1*
No. of 3-bit USPCs for C1: 3 (i.e., $USPC_{C1}$ X, $USPC_{C1}$ Y, $USPC_{C1}$ Z)

Counter Values During Initialization Procedure:
  $USPC_{C1}$ X = 5
  $USPC_{C1}$ Y = 3
  $USPC_{C1}$ Z = 7
  $AUPC_{C1}$ = 15

Counter/Register Values Calculated by Initialization Procedure:
  $UPWC_{C1}$ = $UPWC_{C1}$ Register = $AUPC_{C1}$ >> 3 = 1
  $UPC_{C1}$ = $UPC_{C1}$ Register = $AUPC_{C1}$/gcd($AUPC_{C1}$, 8) = 15/1 = 15
  $LPC_{C1}$ = $LPC_{C1}$ Register = 8/gcd($AUPC_{C1}$, 8) = 8/1 = 8

Resulting Bandwidth Allocation for C1:
$U_{C1}$ $L_{C1}$ $U_{C1}$ $L_{C1}$ $U_{C1}$ $L_{C1}$ $U_{C1}$ $L_{C1}$ $U_{C1}$ $L_{C1}$ $U_{C1}$ $L_{C1}$ $U_{C1}$ $L_{C1}$ $U_{C1}$ $L_{C1}$ $U_{C1}$ $U_{C1}$ $U_{C1}$ $U_{C1}$ $U_{C1}$ $U_{C1}$ $U_{C1}$

*Class 2*
No. of 3-bit USPCs for C2: 3 (i.e., $USPC_{C2}$ X, $USPC_{C2}$ Y, $USPC_{C2}$ Z)

Counter Values During Initialization Procedure:
  $USPC_{C2}$ X = 6
  $USPC_{C2}$ Y = 6
  $USPC_{C2}$ Z = 8
  $AUPC_{C2}$ = 20

Counter/Register Values Calculated by Initialization Procedure:
  $UPWC_{C2}$ = $UPWC_{C2}$ Register = $AUPC_{C2}$ >> 3 = 2
  $UPC_{C2}$ = $UPC_{C2}$ Register = $AUPC_{C2}$/gcd(AUPC, 8) = 20/4 = 5
  $LPC_{C2}$ = $LPC_{C2}$ Register = 8/gcd($AUPC_{C2}$, 8) = 8/4 = 2

Resulting Bandwidth Allocation for C2: $U_{C2}$ $U_{C2}$ $L_{C2}$ $U_{C2}$ $U_{C2}$ $L_{C2}$ $U_{C2}$

*FIG. 19A*

701 Example Continued

702 Key for Example

Key
C1 = Class 1
C2 = Class 2
U = Upstream Packet
L = Local Packet

Class Allocation
Weight for Class C1 ($W_{C1}$) = 10, Weight for Class C2 ($W_{C2}$) = 4

Counter/Register Values:
  WRR = floor($W_{C1}/W_{C2}$) = 2
  RR = $W_{C1} - W_{C2}$ × WRR = 10 − 4 × 2 = 2
  ASRR = floor($W_{C2}$/RR) = 2
  ASCC = ceil($W_{C1}$/(WRR × ASRR + WRR + 1)) = ceil(10/(4 + 2 + 1)) = ceil(10/7) = 2

Resulting Bandwidth Allocation for Each Class of Service:

SEQUENCE: C1 C1 C2 | C1 C1 C1 C2 | C1 C1 C1 C2 | C1 C1 C2 |...
                      Augmented Subsequence            Regular Subsequence Inter Departure Delays for Flow C1: 1,2,1,1,2,1,1,2,1,2
Inter Departure Delays for Flow C2: 4,4,3,3

Jitter of Class C1 = 0.49    Jitter of Class C2 = 0.50

Resulting Sequence of Packets
$U_{C1}$ $L_{C1}$ $U_{C2}$ $U_{C1}$ $L_{C1}$ $U_{C1}$ $U_{C2}$ $L_{C1}$ $U_{C1}$ $L_{C1}$ $L_{C2}$ $U_{C1}$ $L_{C1}$ $U_{C2}$ ...

*FIG. 19B*

CLASSES OF SERVICE FOR NETWORK ON CHIPS

CROSS REFERENCE TO RELATED APPLICATIONS

This patent application is a continuation-in-part (CIP) of U.S. patent application Ser. No. 12/495,498, filed on Jun. 30, 2009, having the same Assignee. Accordingly, this patent application claims benefit of U.S. patent application Ser. No. 12/495,498 under 35 U.S.C. §120. This patent application is also a CIP of U.S. patent application Ser. No. 12/982,585, filed on Dec. 30, 2010, having the same Assignee. Accordingly, this patent application claims benefit of U.S. patent application Ser. No. 12/982,585 under 35 U.S.C. §120. U.S. patent application Ser. No. 12/982,585 and U.S. patent application Ser. No. 12/495,498 are incorporated herein by reference in their entirety.

BACKGROUND

Network-on-Chip (NoC) is a model for communications within systems implemented on a single chip (e.g., a silicon chip). In a NoC system, multiple devices such as processor cores, memories, IO devices, and specialized logic blocks exchange data (e.g., data packets) using a network. A switched NoC is constructed from multiple point-to-point data links interconnected by switches, such that the data packets can be relayed from any source device to any destination device over several data links, by way of specific routing decisions at the switches.

In a switched NoC system, a high level of parallelism is achieved because all links and switches in the switched NoC may operate simultaneously on different data packets. Accordingly, as the complexity of integrated circuits continues to grow, a switched NoC provides enhanced performance (e.g., throughput) and scalability. However, algorithms must be designed in such a way to offer large parallelism and thus utilize the potential of the switched NoC architecture.

SUMMARY

In general, in one aspect, the invention relates to a method for transmitting packets by a local switch of multiple switches on a single chip. The multiple switches are interconnected in a daisy chain topology. The method includes a local switch receiving a first plurality of upstream packets, each assigned a first class of service, from an upstream switch of the plurality of switches. The local switch also receives a first plurality of local packets, each assigned the first class of service, from a local device located on the chip. The local switch inserts, according to a first insertion rate, at least one of the first plurality of local packets between a plurality of subsets of the first plurality of upstream packets to obtain a first ordered plurality of first class packets. The method further includes the local switch receiving a second plurality of upstream packets, each assigned a second class of service, from the upstream switch. The local switch receives a second plurality of local packets, each assigned the second class of service, from the local device. The local switch inserts, according to a second insertion rate, at least one of the second plurality of local packets between plurality of subsets of the second plurality of upstream packets to obtain an ordered plurality of second class packets. Additionally, the method includes for each timeslot of a plurality of timeslots, selecting a selected class of service from a set comprising the first class of service and the second class of service, and forwarding, during the timeslot, a packet from the selected class of service to a downstream switch of the plurality of switches. The packet from the selected class of service is obtained from a set that includes the first ordered plurality of first class packets and the ordered plurality of second class packets.

In general, in one aspect, the invention relates to a chip that includes a plurality of switches interconnected in a daisy chain topology. The plurality of switches includes an upstream switch, a downstream switch, and a local switch, operatively connected to a local device and interposed between the upstream switch and the downstream switch. The local switch includes a first class upper packet queue, a first class local packet queue, a second class upper packet queue, and a second class upper packet queue. The first class upper packet queue is configured to store a first plurality of upstream packets, each assigned a first class of service, and received from the upstream switch. The first class local packet queue is configured to store a first plurality of local packets, each assigned the first class of service, and received from the local device. The second class upper packet queue is configured to store a second plurality of upstream packets, each assigned a second class of service, and received from the upstream switch. The second class local packet queue is configured to store a second plurality of local packets, each assigned the second class of service, and received from the local device. The local switch further includes a packet scheduling engine configured to insert, according to a first insertion rate, at least one of the first plurality of local packets between a plurality of subsets of the first plurality of upstream packets to obtain an ordered plurality of first class packets, and insert, according to a second insertion rate, at least one of the second plurality of local packets between a plurality of subsets of the second plurality of upstream packets to obtain an ordered plurality of second class packets. The local switch further includes a class scheduling engine configured to, for each timeslot of a plurality of timeslots, select a selected class of service from a set comprising the first class of service and the second class of service, and forward, during the timeslot, a packet from the selected class of service to the downstream switch. The packet is obtained from a set that includes the ordered plurality of first class packets and the ordered plurality of second class packets.

In general, in one aspect, the invention relates to a chip that includes a plurality of switches interconnected in a daisy chain topology. The plurality of switches includes an upstream switch operatively connected to an upstream device, a downstream switch operatively connected to a downstream device, and a local switch, operatively connected to a local device and interposed between the upstream switch and the downstream switch. The local switch includes an upper packet queue, a first class local packet queue, and a second class local packet queue. The upper packet queue is configured to store a plurality of upstream packets. The plurality of upstream packets comprises a plurality of first class upstream packets assigned a first class of service, and a plurality of second class upstream packets assigned a second class of service, and received from the upstream switch. The first class local packet queue is configured to store a first plurality of local packets, each assigned the first class of service, and received from the local device. The second class local packet queue is configured to store a second plurality of local packets, each assigned the second class of service, and received from the local device. The local switch further includes a packet scheduling engine configured to insert, according to a first insertion rate, at least one of the first plurality of local packets between a first plurality of subsets of the plurality of upstream packets to obtain an ordered plurality of first class packets, and insert, according to a second insertion rate, at least one of the second plurality of local packets between a second plurality of subsets of the plurality of upstream packets to obtain an ordered plurality of second class packets. The local switch further includes a class scheduling engine configured to, for each of a plurality of timeslots select a selected class of service from a set comprising the first class of service and the second class of service, and forward, during the timeslot, a packet from the selected class of service to the downstream switch. The packet is obtained from a set that includes the ordered plurality of first class packets and the ordered plurality of second class packets.

Other aspects of the invention will be apparent from the following description and the appended claims.

BRIEF DESCRIPTION OF DRAWINGS

FIGS. 19A-19C show an example in accordance with one or more embodiments of the invention.

DETAILED DESCRIPTION

Figure 1:
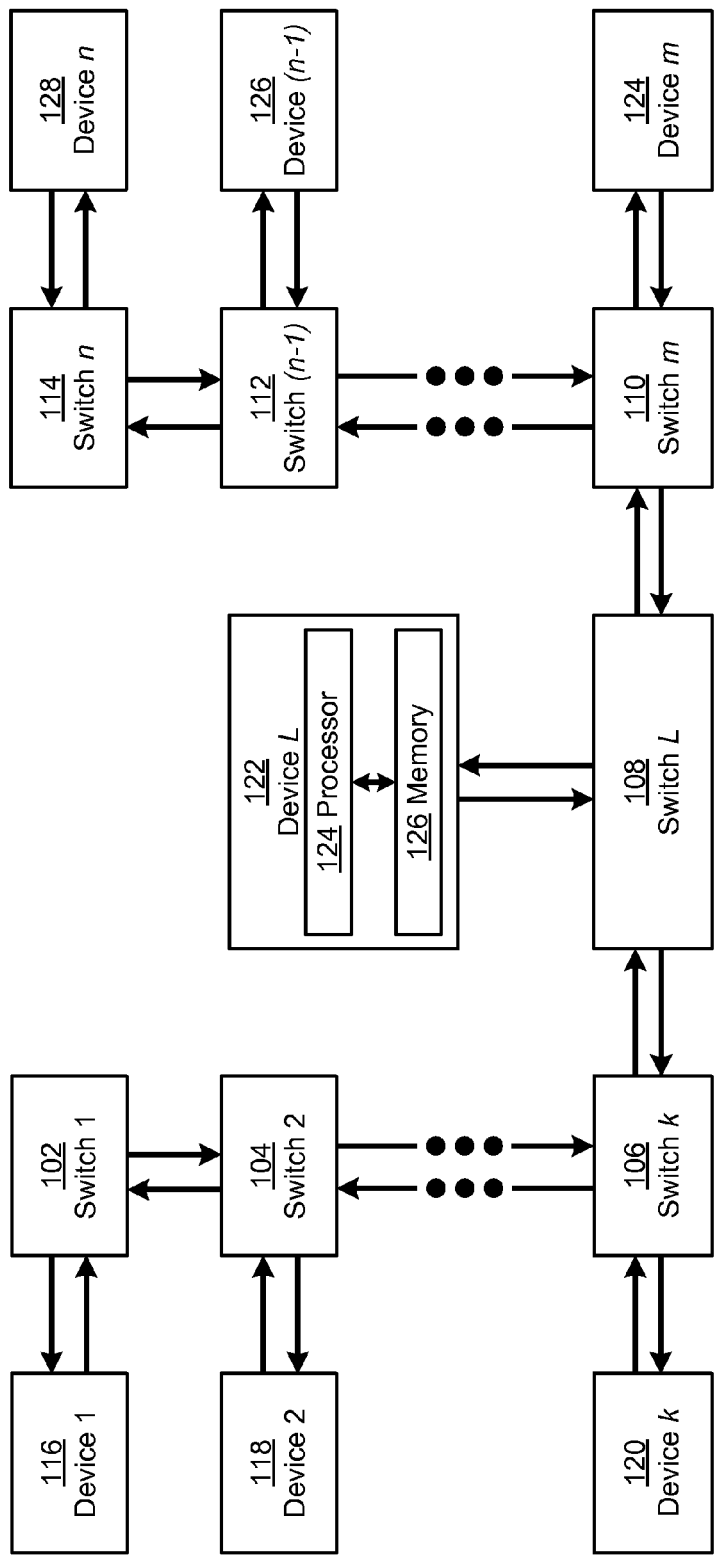
FIGS. 1-7 show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and a chip for implementing multiple classes of service in a network on the chip. The class of service defines the priority for the packets assigned to the class of service. Priorities refer to bandwidth allocation. Specifically, higher priorities are allocated greater bandwidth than lower priorities.

FIGS. 1-7 show schematic diagrams in one or more embodiments of the invention. In FIGS. 1-7, three co-linear dots indicate that additional items of similar type to the preceding and succeeding items with respect to the dots may optionally exist. Additionally, in FIGS. 1-7, thick lines show the logical path packets may travel in one or more embodiments of the invention. Other logical paths may be used in one or more embodiments of the invention. Further, although FIGS. 1-7 show a certain configuration of components, other configurations may be used without departing from the scope of the invention. For example, some components may be combined and/or the functionality and logic associated with the component may be performed by separate or different components.

FIG. 1 shows a system in accordance with one or more embodiments of the invention. In one or more embodiments of the invention, the system is located on a single chip. The single chip may include additional components without departing from the scope of the invention. As shown in FIG. 1, the system has multiple switches (e.g., switch 1 (102), switch 2 (104), switch k (106), switch L (108), switch m (110), switch n–1 (112), switch n (114)).

As shown in FIG. 1, the switches are arranged in a bi-directional daisy chain in one or more embodiments of the invention. Thus, to pass a packet between switch 1 (102) and switch n (114), the packet passes through each other switch on the chip in one or more embodiments of the invention. The daisy chain of switches is bi-directional in that packets may be forwarded in both directions (e.g., from switch 1 (102) to switch n (114) and from switch n (114) and switch 1 (102)).

From the perspective of a particular switch, the particular switch is referred to as a local switch. For example, from the perspective of switch L (108), switch L (108) is a local switch. As another example, from the perspective of switch n–1 (112), switch n–1 (112) is a local switch.

For a particular direction, from the perspective of a particular switch (i.e., local switch), switches that may forward packets are upstream switches, switches to which the packets may be forwarded are downstream switches. For example, consider the direction of packets from any one of switch 1 (102), switch 2 (104), switch k (106) to any one of device L (122), switch m (110), switch n–1 (112), switch n (114). In the example, the switches located to the right of the switch L (108) in FIG. 1 (e.g., switch m (110), switch n–1 (112), and switch n (114)) are considered downstream switches from the perspective of switch L (108). In contrast, in the example, the switches located to the left of the switch L (108) in FIG. 1 (e.g., switch 1 (102), switch 2 (104), switch k (106)) are considered upstream switches from the perspective of switch L (108).

In a converse example, consider the direction of packets from any one of switch m (110), switch n–1 (112), switch n (114) to any one of device L (122), switch 1 (102), switch 2 (104), switch k (106). In the example, the switches located to the right of the switch L (108) in FIG. 1 (e.g., switch m (110), switch n–1 (112), and switch n (114)) are considered upstream switches from the perspective of switch L (108). In contrast, in the example, the switches located to the left of the switch L (108) in FIG. 1 (e.g., switch 1 (102), switch 2 (104), switch k (106)) are considered downstream switches from the perspective of switch L (108).

The switches (e.g., 102, 104, 106, 108, 110, 112, 114) may have essentially the same components (discussed below). Alternatively, one or more switches may have different components without departing from the scope of the invention.

In one or more embodiments of the invention, each switch is connected to a device (e.g., device 1 (116), device 2 (118), device k (120), device L (122), device m (124), device n–1 (126), device n (128)). As shown in FIG. 1, switch 1 (102) is connected to device 1 (116), switch 2 (104) is connected to device 2 (118), switch k (106) is connected to device k (120), switch 1 (108) is connected to device L (122) switch m (110) is connected to device m (124), and so forth. From the perspective of each switch, the device the switch is connected to is a local device. For example, from the perspective of switch L (108), device L (122) is a local device. By way of another example, from the perspective of switch k (106), device k (120) is a local device. Each device (116, 118, 120, 122, 124, 126, 128) may include one or more processing cores, an input/output (I/O) device, a memory (e.g., a cache memory), and/or a specialized logic block. For example, the device L (122) includes a processor (124) and a memory (126).

With regards to a particular direction, and from the perspective of a particular switch, a device connected to an upstream switch may be considered an upstream device. Moreover, the combination of an upstream device and the upstream device's corresponding upstream switch may be referred to as an upstream source. In contrast, a device connected to a downstream switch may be considered a downstream device. Further, the combination of a downstream device and the downstream device's corresponding downstream switch may be referred to as a downstream destination.

In one or more embodiments of the invention, a device is a source and/or a destination of a packet (e.g., data packet, control packet, etc.). In other words, a device in the system may be configured to generate packets destined for other devices in the system. Similarly, a device in the system may be configured to accept packets generated by other devices in the system and other devices not located on a chip. In one or more embodiments of the invention, the header of a packet identifies the source device and/or the destination device of the packet. The header may also include a class of service identifier. Specifically, each switch associates the same class of service identifier with the same class of service. Further, each switch implements the same priority level for the same class of service.

For example, consider a processor request for the contents of a memory address (i.e., memory location). If the processor issuing the request and the memory block having the memory address are located in different devices, a packet may be used to send the request to the memory block. The packet would be generated by the device having the processor and destined for the device having the memory block with the desired memory address. A response to the request may also be sent using a packet.

In one or more embodiments of the invention, the switches (102, 104, 106, 108, 110, 112, 114) are used to route packets between the devices (116, 118, 120, 122, 124, 126, 128). In other words, a packet generated by any device (on or off the chip) may be routed to any other device on the chip using one or more of the switches. A packet is routed by every switch along the path from the source device of the packet to the destination device of the packet. As shown in FIG. 1, the path from an upstream device (e.g., device 2 (118)) to a downstream device (e.g., downstream device n (128)) includes the switch L (108). Accordingly, a packet that is both (i) generated by an upstream device; and (ii) destined for a downstream device is routed by the local switch.

Although FIG. 1 shows seven switches and seven devices, as shown by the use of three co-linear dots, more switches and devices may be included without departing from the scope of the invention. Further, fewer switches and devices may exist without departing from the scope of the invention.

Figure 2:
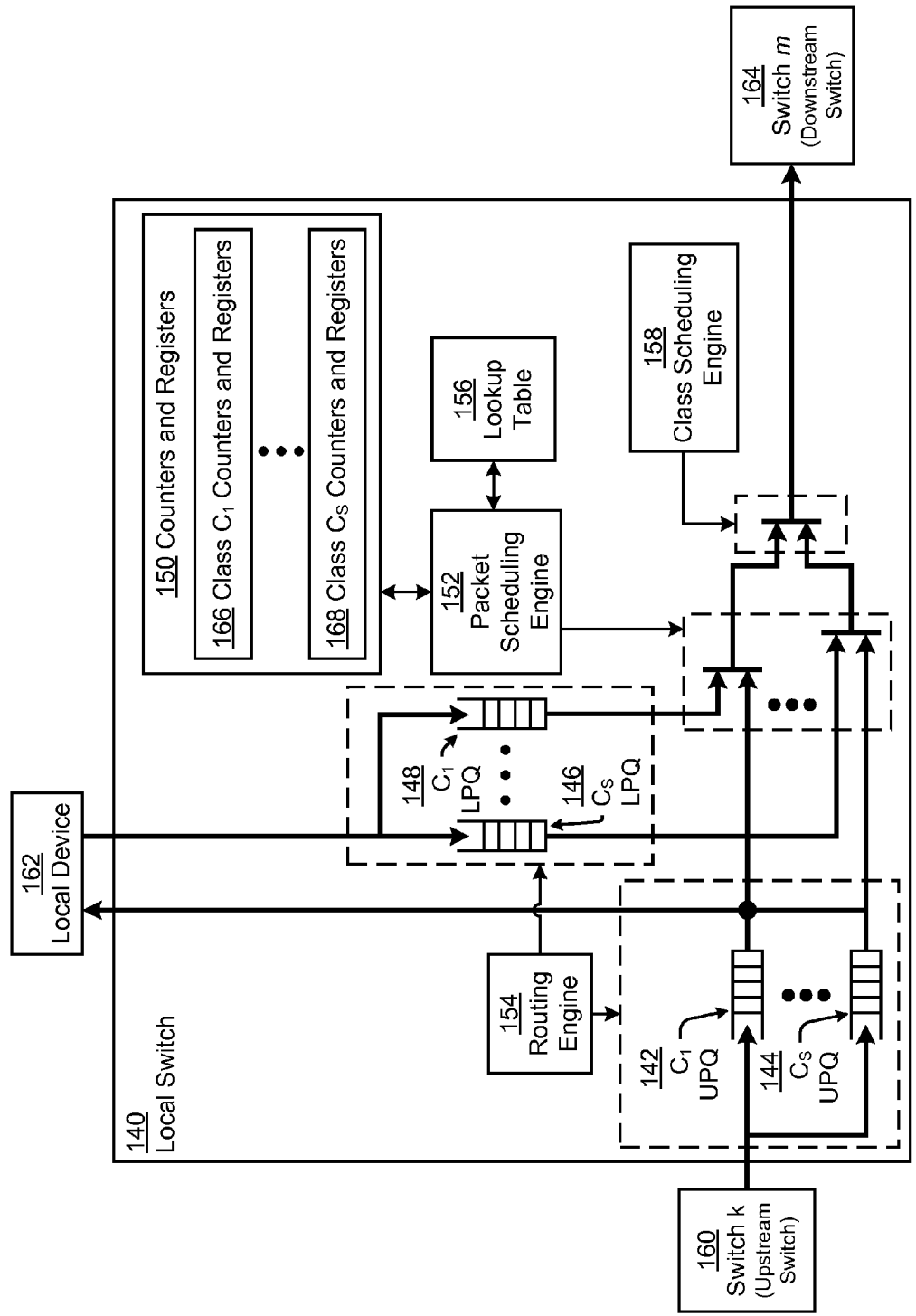

FIG. 2 shows a schematic diagram of a system in accordance with one or more embodiments of the invention. Specifically, FIG. 2 shows components of local switch (140) in one or more embodiments of the invention. Local switch (140) may be any switch in FIG. 1 in one or more embodiments of the invention.

As shown in FIG. 2, the local switch (140) has multiple components including multiple upstream packet queues (e.g., class 1 upstream packet queue ($C_1$ UPQ) (142), class s upstream packet queue ($C_S$ UPQ) (144)), local packet queues (LPQ) (e.g., class 1 local packet queue ($C_1$ LPQ) (148), class s local packet queue ($C_S$ LPQ) (146)), counters and registers (150), a packet scheduling engine (152), a routing engine (154), and a lookup table (156), and a class scheduling engine (158). The local switch (140) may include additional components without departing from the scope of the invention. Further, one or more components may be combined or separated in one or more embodiments of the invention. For example, the lookup table (156) and the counters and registers (150) may be a part of the packet scheduling engine (152). As another example, the class scheduling engine (158) may include or be connected to components not shown in FIG. 2 without departing from the scope of the invention.

In one or more embodiments of the invention, the queues (142, 144, 146, 148), the packet scheduling engine (152), the routing engine (154), the counters and registers (150), the lookup table (156), and the class scheduling engine (158) are implemented in hardware. For example, the components may be implemented using multiplexers, flip flops, registers, lookup tables, transistors, processors, integrated circuits, and/or any other type of hardware component. Alternatively or additionally, one or more of the aforementioned components may be implemented in software or any combination of hardware or software. Each component of the local switch (140) is discussed below.

In one or more embodiments of the invention, the queues (142, 144, 146, 148) in the local switch (140) are used to store incoming packets. UPQs (142, 144) may store incoming packets from the upstream switch k (160) (i.e., upstream packets) that are destined for the local device or any of the downstream devices. Further, the LPQs (146, 148) may store incoming packets that are generated by the local device (162) (i.e., local packets) and destined for any of the downstream devices.

In one or more embodiments of the invention, each set of queues (e.g., UPQs (142,144), LPQs (146,148)) includes a separate queue for each class of service. Specifically, as shown in FIG. 2, consider the scenario in which S classes of service exist. Each class of service has a separate queue. Thus, for example, class $C_1$ has a corresponding UPQ (i.e., $C_1$ UPQ (142)) and a corresponding LPQ (i.e., $C_1$ LPQ (148)). Only packets that are assigned to class $C_1$ are placed in $C_1$ UPQ (142) or $C_1$ LPQ (148)) in one or more embodiments of the invention. Similarly, class $C_S$ has a corresponding UPQ (i.e., $C_S$ UPQ (144)) and a corresponding LPQ (i.e., $C_S$ LPQ (146)). Only packets that are assigned to class $C_S$ are placed in $C_S$ UPQ (144) or $C_S$ LPQ (146)) in one or more embodiments of the invention. Other classes of service, if the other classes of service exist, have similar dedicated queues for storing packets in one or more embodiments of the invention.

In one or more embodiments of the invention, the upstream switch k (160) and the local device (162) are directly connected to the UPQs (142, 144) and the LPQs (146, 148), respectively. In such embodiments, the upstream switch k (160) may be configured to push an upstream packet onto one of the UPQs (142, 144) and the local device (162) may be configured to push a local packet onto the LPQ (146, 148).

In alternative embodiments of the invention, separate routing logic exists to route packets to the appropriate queue based on the class of service assigned to the packet. For example, in one or more embodiments of the invention, the routing engine (154) may be configured to route an incoming packet received from an upstream switch (160) to either the local device (162) or the UPQ (142, 144) for the particular class of service, depending on whether the incoming packet is destined for the local device (162) or destined for a downstream device (164). Specifically, the routing engine (154) may include functionality to determine based on the header of the packet whether the packet has a destination of the local device (162) and route the packet to the local device when the packet has the destination of the local device. Further, the routing engine (154) may include functionality to determine based on the header of the packet which class of service the packet is assigned and route the packet to the UPQ (142, 144) corresponding to the assigned class of service. In one or more embodiments of the invention, the local switch (140) includes a connection (not shown) between the local device (162) and the upstream switch k (160) which bypasses the UPQs (142, 144). In such embodiments, any incoming packets destined for the local device (162) are routed to the local device (162) without first being placed in the UPQs (142, 144). Accordingly, in such embodiments, the UPQs (142, 144) only store packets for downstream devices.

The same or different routing engines (154) may exist for routing packets from the local device to the appropriate LPQs (146,148). Specifically, the routing engine (154) may include functionality to determine based on the header of the packet which class of service the packet is assigned and route the packet to the LPQ (146, 148) corresponding to the assigned class of service.

Continuing with FIG. 2, the UPQs (142, 144) and the LPQs (146, 148) are connected to a packet scheduling engine (152). The packet scheduling engine (152) is configured to (i) forward upstream packets from the UPQs (142, 144) to the class scheduling engine (158); and (ii) forward local packets from the LPQ (146, 148) to the class scheduling engine (158). In one or more embodiments of the invention, the packet scheduling engine (152) is configured to select, for a particular class of service, whether to forward an upstream packet or whether to forward a local packet.

In one or more embodiments of the invention, packet scheduling engine (152) is connected to counters and registers (150) (discussed below) for forwarding the packets. Separate counters and registers exist for each class of service in one or more embodiments of the invention. For example, class $C_1$ has corresponding Class $C_1$ counters and registers (166). Similarly, class $C_S$ has a unique set of corresponding Class $C_S$ counters and registers (168).

Returning to the packet scheduling engine (152), in one or more embodiments of the invention, as shown in FIG. 2, the same packet scheduling engine may be configured to forward packets for each class of service. In such a scenario, the packet scheduling engine (152) includes functionality to select and access the particular set of counters and registers (166, 168) for the particular class that the packet scheduling engine is scheduling (152). For example, when the packet scheduling engine (152) is scheduling packets between the $C_1$ UPQ (142) and the $C_1$ LPQ (148), then the packet scheduling engine (152) includes functionality to schedule the packets using the class $C_1$ counters and registers (166). Conversely, when the packet scheduling engine (152) is scheduling packets between the $C_S$ UPQ (144) and the $C_S$ LPQ (146), then the packet scheduling engine (152) includes functionality to schedule the packets using the class $C_S$ counters and registers (168). Alternatively or additionally, separate packet scheduling engines may exist for each class of service or subsets of classes of service without departing from the scope of the invention.

In one or more embodiments of the invention, the packet scheduling engine (152) forwards local packets or forwards upstream packets according to a fairness protocol. In other words, the fairness protocol determines when the local switch (140) is to forward upstream packets and when the local switch (140) is to forward local packets for a particular class of service. The fairness protocol effectively implements a "fair" allocation of the existing finite bandwidth between the local device and the upstream devices. The fairness protocol may be implemented in software and executed on the packet scheduling engine (152). Alternatively, the packet scheduling engine (152) may include a hardware implementation of the fairness protocol.

In one or more embodiments of the invention, the fairness protocol sets one or more of the counters and registers (150) using values in the lookup table (156), and then reads the counters and registers (150) at a subsequent time to determine whether the local switch (140) should forward upstream packets or whether the local switch should forward local packets for a particular class of service.

The output of the packet scheduling engine (152) is ordered packets for a particular class. The ordered packets include a mix of upstream packets and local packets for a particular class. For example, for class $C_1$, the output of the packet scheduling engine is ordered class $C_1$ packets that include packets from $C_1$ LPQ (148) and $C_1$ UPQ (142). For class $C_S$, the output of the packet scheduling engine is ordered class $C_S$ packets that include packets from $C_S$ LPQ (146) and $C_S$ UPQ (144).

Continuing with FIG. 2, the class scheduling engine (158) is configured to forward ordered class packets for a particular class to the switch m (164). In one or more embodiments of the invention, the class scheduling engine (158) includes functionality to order the packets according to a schedule. For example, the class scheduling engine may implement a weighted round robin scheduler, a low jitter scheduler (discussed below with reference to FIGS. 6, 7, and 15-18), or any other schedule. The schedule implemented by the class scheduling engine (158) defines, for a particular timeslot (i.e., unit of time), from which class to forward the packet.

A weighted round robin schedule assigns weights to each class of service. The weight defines the relative number of packets that is forwarded as compared to other classes. For example, the weight may define for a particular round, the number of packets forwarded in that round. For example, if class $C_1$ is assigned a weight of 1 and class $C_S$ is assigned a weight of 5, then for every 1 packet assigned class $C_1$ forwarded, 5 packets assigned class $C_S$ are forwarded. A low jitter scheduler is discussed below.

Continuing with FIG. 2, FIG. 2 shows packets traveling from switch k (160) and local device (162) to switch m (164). In other words, switch k (160) is an upstream switch and switch m is a downstream switch (164). However, packets may travel from switch m (164) to the local device (162) and to switch k (160) in one or more embodiments of the invention.

Figure 3:
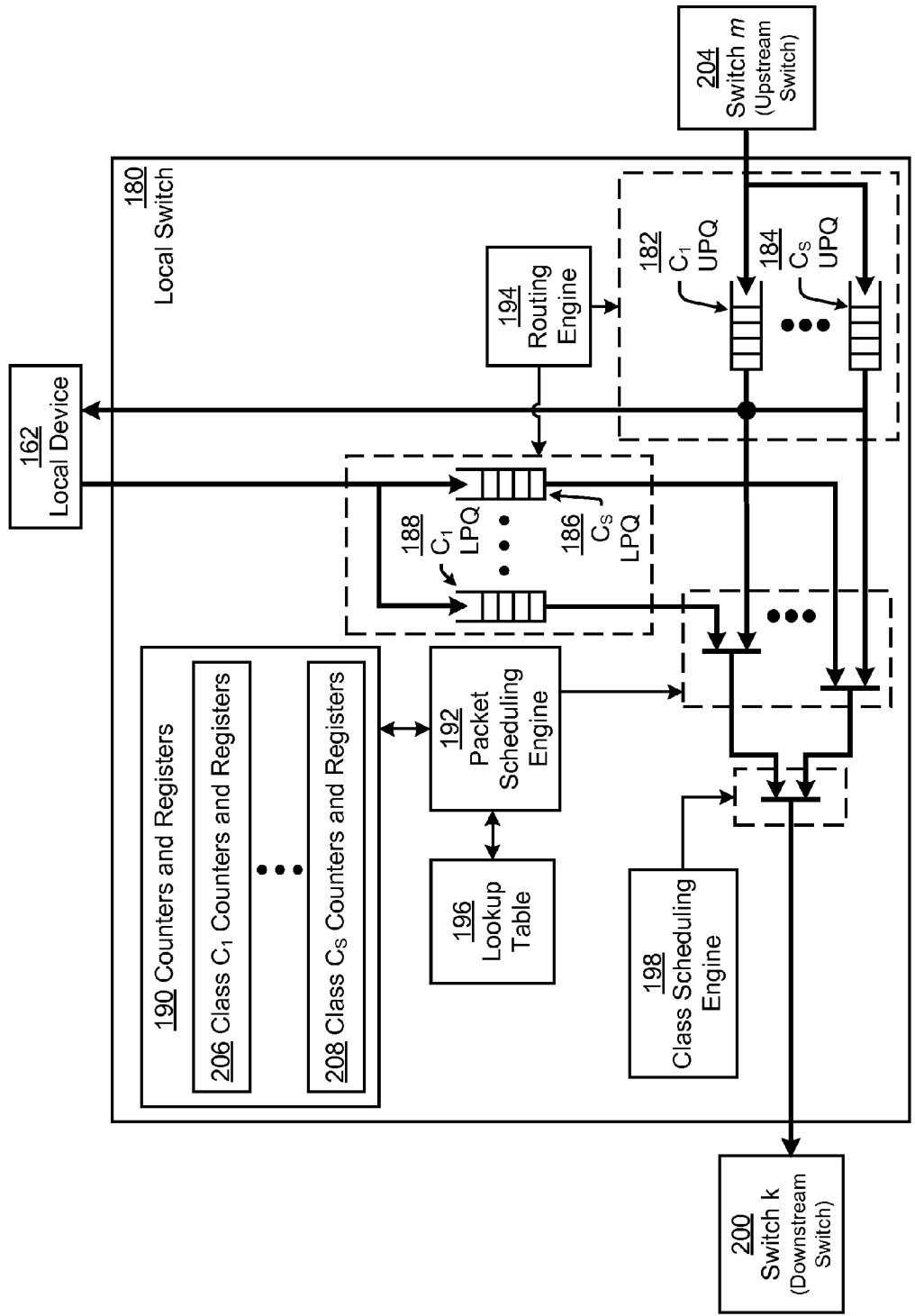

FIG. 3 shows a schematic diagram of a local switch (180) configured to allow packets to travel from switch m (204) to the local device (162) and to switch k (200) in one or more embodiments of the invention. Specifically, the components shown in FIG. 3 may additionally or alternatively exist on the same local switch as shown in FIG. 2. The local switch (180), switch k (200), and switch m (204) may be the same or a different switch than local switch (140), switch k (160), and switch m (164), respectively, in FIG. 2.

In one or more embodiments of the invention, the local switch (180), routing engine (194), UPQs (e.g., $C_1$ UPQ (182) $C_S$ UPQ (184)), LPQs (e.g., $C_1$ LPQ (188) $C_S$ LPQ (186)), class scheduling engine (198), packet scheduling engine (192), lookup table (196), counters and registers (190) (e.g., class $C_1$ counters and registers (206), class $C_S$ counters and registers (208)) includes the same or substantially the same functionality and attributes as one or more embodiments of the identically named corresponding components in FIG. 2. Further, some components shown in FIG. 3 may be the same component as shown in FIG. 2. For example, the lookup table (196) in FIG. 3 may be the same lookup table (156) shown in FIG. 2.

Figure 4:
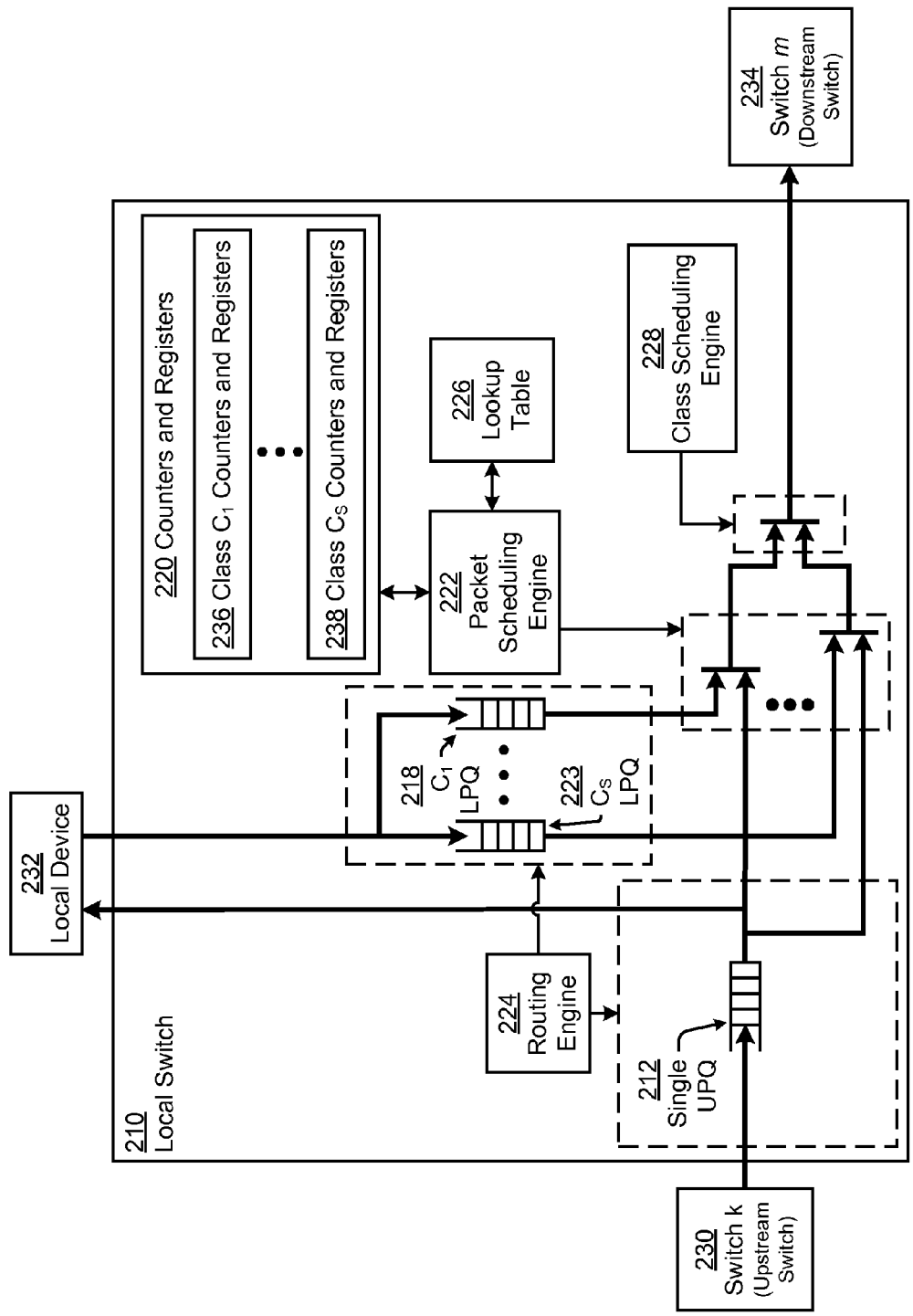

FIG. 4 shows a schematic diagram of a local switch (210) in one or more embodiments of the invention. Specifically, FIG. 4 shows an alternative configuration to FIG. 2. In the alternative configuration, rather than having multiple packet queues, one for each class of service, the local switch (210)

has only a single UPQ (212). The single UPQ (212) may include packets from the multiple classes of service. As shown in FIG. 4, the remaining components of the local switch may remain the same. For example, in FIG. 4, the local switch (232), switch k (230), switch m (234), local device (232), routing engine (224), LPQs (e.g., $C_1$ LPQ (218) $C_S$ LPQ (223)), class scheduling engine (228), packet scheduling engine (222), lookup table (226), counters and registers (220) (e.g., class $C_1$ counters and registers (236), class $C_S$ counters and registers (238)) include the same or substantially the same functionality and attributes as the one or more embodiments of the identically named corresponding components in FIG. 2.

In one or more embodiments of the invention, because only a single UPQ (212) exists on the local switch (210), the single UPQ (212) may include packets assigned to multiple different classes of service. Because each class of service has a separate LPQ on each upstream switch, packets from the LPQ on the upstream switch are approximately ordered according to the class of service. Accordingly, when the packets arrive at the local switch, the packets remain approximately ordered in the single UPQ of the downstream switch in accordance with the priority set by the class scheduling engine of the upstream switches.

Continuing with FIG. 4, the packet scheduling engine (222) includes functionality to obtain packets in order from the single UPQ (212) regardless of the particular class of service that the packet scheduling engine is scheduling. For example, if the packet scheduling engine (222) is scheduling packets for class $C_1$, then the packet scheduling engine is configured to obtain next set of packets from the single UPQ (212), and obtains the next set of local packets assigned to class $C_1$ from $C_1$ LPQ (218). In the example, because the single UPQ (212) includes an intermingling of packets for different classes, when the packet scheduling engine obtains the next set of packets from the single UPQ (212), the next set of packets may actually include class $C_S$ packets. The class scheduling engine (228) includes functionality to obtain ordered packets for a particular class from the packet scheduling engine (222) and forward the packets to the switch m (234).

Because the configuration of FIG. 4 separates local packets into classes of service and maintains the packet scheduling and class scheduling, the packets are heuristically processed based on the class of service in one or more embodiments of the invention. In other words, the packets in the single UPQ (212) are approximately transferred according to the class of service assigned to the packet.

Although not shown in the Figs., similar to the difference between FIG. 2 and FIG. 3, the switch in FIG. 4 may be further or alternatively configured to allow packets to travel in the opposite direction than shown in FIG. 4.

Figure 5:
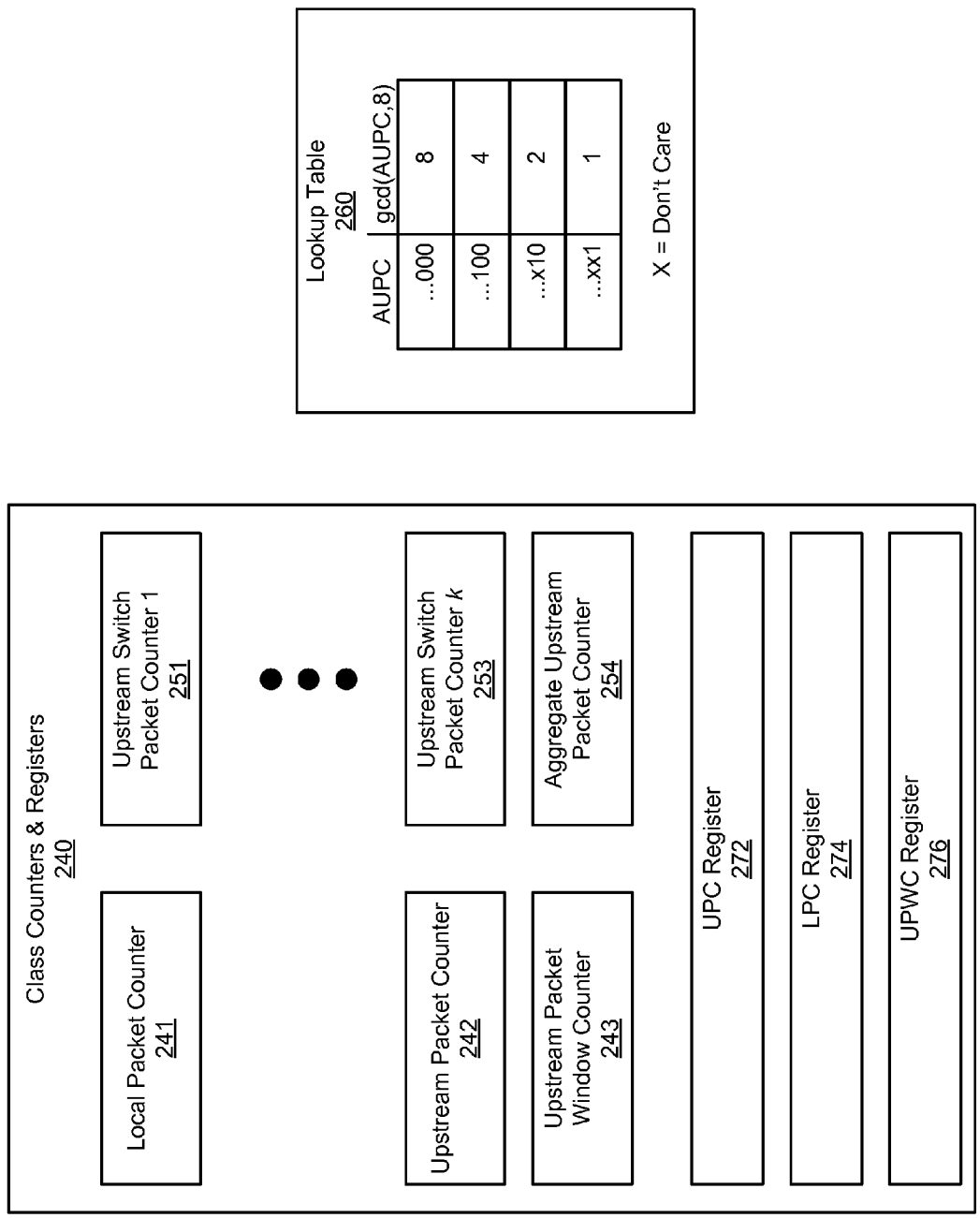

Continuing with the schematic diagrams, FIG. 5 shows a schematic diagram of the counters and registers and lookup table in one or more embodiments of the invention. In one or more embodiments of the invention, the counters and registers shown in FIG. 5, may correspond to any one of the class counters and registers shown in FIGS. 2-4. Specifically, the counters and registers in FIG. 5 are for a particular class. Each class may have a separate and similar set of counters and registers as the counters and registers shown in FIG. 5.

As shown in FIG. 5, the counters and registers (240) include a local packet counter (LPC) (241), an upstream packet counter (UPC) (242), an upstream packet window counter (UPWC) (243), multiple upstream switch packet counters (USPC) (i.e., USPC 1 (251), USPC k (253)), and an aggregate upstream packet counter (AUPC) (254). The counters and registers (240) also include a UPC Register (272), a LPC Register (274), and a UPWC Register (276). FIG. 5 also shows a lookup table (260) storing the greatest common divisor (gcd) of a predetermined value (i.e., eight) and various values of the AUPC (254). The lookup table (260) may correspond to any of the lookup tables discussed above in reference to FIGS. 2-4. Both the counters and registers (240) and the lookup table (260) are discussed below.

In one or more embodiments of the invention, a USPC (251, 253) is a hardware counter corresponding to an upstream device. Specifically, there may be one USPC for each upstream device in the system. Accordingly, USPC 1 (251) may correspond to the upstream device 1. Similarly, USPC k (253) may correspond to the upstream device k. A USPC is incremented every time the local switch forwards a packet that was generated by the corresponding upstream device. For example, USPC 1 (251) increments by one every time the local switch forwards a packet that was generated by the upstream device 1. As another example, USPC k (253) increments by one every time the local switch forwards a packet that was generated by the upstream device k. Each USPC (251, 253) may be a 3-bit hardware counter. Accordingly, each USPC has a maximum value of seven. Each 3-bit USPC (251, 253) wraps around (i.e., resets) to reach the value of eight. When a USPC (251, 253) reaches eight (or any predetermined value), this implies that eight upstream packets generated by the same upstream device were included in the last N forwarded upstream packets (i.e., N≥8).

In one or more embodiments of the invention, the AUPC (254) is a hardware counter that increments by one every time an upstream packet is forwarded by the local switch, regardless of which upstream device generated the upstream packet. In other words, the AUPC (254) increments by the cardinality of the forwarded upstream packets. For example, AUPC (254) increments by five (i.e., five separate increments by one) when three upstream packets, generated by upstream device 1, and two upstream packets, generated by upstream device k, are forwarded by the local switch (i.e., 3 upstream packets+2 upstream packets=5 upstream packets). In one or more embodiments of the invention, the AUPC (254) is a 7-bit hardware counter. Accordingly, the AUPC (254) may have a maximum value of 127.

In one or more embodiments of the invention, the LPC (241) is a hardware counter that decrements by one every time the local switch forwards a local packet. For example, when the local switch forwards a local packet from the LPQ, the LPC (241) decrements by one. In one or more embodiments of the invention, when at least one USPC (251, 253) reaches a predetermined value, the LPC (241) is set to LPC (241)= (predetermined value)/gcd(AUPC (254), predetermined value). The predetermined value may correspond to the wrap around value of the USPCs (251, 253). For example, in view of the above, the predetermined value may be eight. Accordingly, the LPC (241) may be set to LPC (241)=8/gcd(AUPC (254), 8) every time at least one USPC (251, 253) reaches eight.

In one or more embodiments of the invention, the UPC (242) is a hardware counter that decrements by one every time the local switch forwards an upstream packet, regardless of which upstream device generated the upstream packet. In other words, the UPC (242) may decrement by the cardinality of the forwarded upstream packets. For example, when the local switch forwards an upstream packet from the UPQ, the UPC (242) decrements by one. Similarly, when the local switch forwards three upstream packets from the UPQ, the UPC (242) decrements by three (i.e., three separate decrements by one). In one or more embodiments of the invention, when at least one USPC (251, 253) reaches a predetermined value, the UPC (242) is set to UPC (242)=AUPC (254)/gcd (AUPC (254), predetermined value). As discussed above, the predetermined value may be eight and correspond to the wrap around value of a USPC (251, 253). Accordingly, the UPC (242) may be set to UPC (242)=AUPC (254)/gcd(AUPC (254), 8) every time at least one USPC (251, 253) reaches eight.

In one or more embodiments of the invention, the UPWC (243) is a 3-bit hardware counter that specifies how many back-to-back upstream packets can be forwarded. Accordingly, the UPWC (243) decrements by one every time the local switch forwards an upstream packet. In other words, the UPWC (243) may decrement by the cardinality of the forwarded upstream packets. In one or more embodiments of the invention, every time at least one USPC (251, 253) reaches a predetermined value, the UPWC (243) is set to the value of UPWC (243)=AUPC (254)>>3 (i.e., the value of AUPC (254) following three bit shift right operations). As discussed above, the predetermined value may be eight and correspond to the wrap around value of a USPC (251, 253). Accordingly, the UPWC (243) may be set to UPWC (243)= AUPC (254)>>3 every time at least one USPC (251, 253) reaches eight. In one or more embodiments of the invention, AUPC (254)>>3 is equivalent to $\lfloor (AUPC\ (254)/8) \rfloor$ (i.e., rounding down the quotient of AUPC (254) divided by 8).

In one or more embodiments of the invention, the UPC Register (272), the LPC Register (274), and the UPWC Register (276) are registers holding values for restoring the UPC (242), the LPC (241), and the UPWC (243), respectively. In other words, the registers (272, 274, 276) may store the "old" or previous values of the corresponding counters (241, 242, 243). In one or more embodiments of the invention, the registers (272, 274, 276) may be updated independently of the corresponding counters.

In one or more embodiments of the invention, the UPC Register (272) is set to UPC Register (272)=AUPC (254)/gcd (AUPC (254), predetermined value) every time at least one USPC (251, 253) reaches the predetermined value. Further, the LPC Register (274) may be set to LPC Register (274)= (predetermined value)/gcd(AUPC (254), predetermined value) every time at least one USPC (251, 253) reaches the predetermined value. Further still, the UPWC Register (276) may be set to UPWC Register (276)=AUPC (254)>>3, every time at least one USPC (251, 253) reaches the predetermined value. In one or more embodiments of the invention, the UPC Register (272), the LPC Register (274), and the UPWC Register (276) are each 3-bits in size.

Still referring to FIG. 5, the lookup table (260) stores the greatest common divisor of a predetermined value (e.g., eight) and various values of the AUPC (254). For example, if the last three bits of the AUPC (254) are 000, the gcd(AUPC (254)= . . . 000, 8)=8. Similarly, if the last three bits of the AUPC (254) are 100, the gcd(AUPC (254)= . . . 100, 8)=4. As yet another example, if the last three bits of the AUPC (254) are x10, the gcd(AUPC (254)= . . . x10, 8)=2. For all other values of AUPC (254), the gcd(AUPC (254), 8)=1. In one or more embodiments of the invention, accessing the lookup table (260) may require less time and fewer resources than calculating the greatest common divisor of two numbers. Accordingly, by creating the lookup table (260) prior to running a process (i.e., the fairness protocol) requiring the greatest common divisor of two numbers, computational time and resources are saved.

Figure 6:
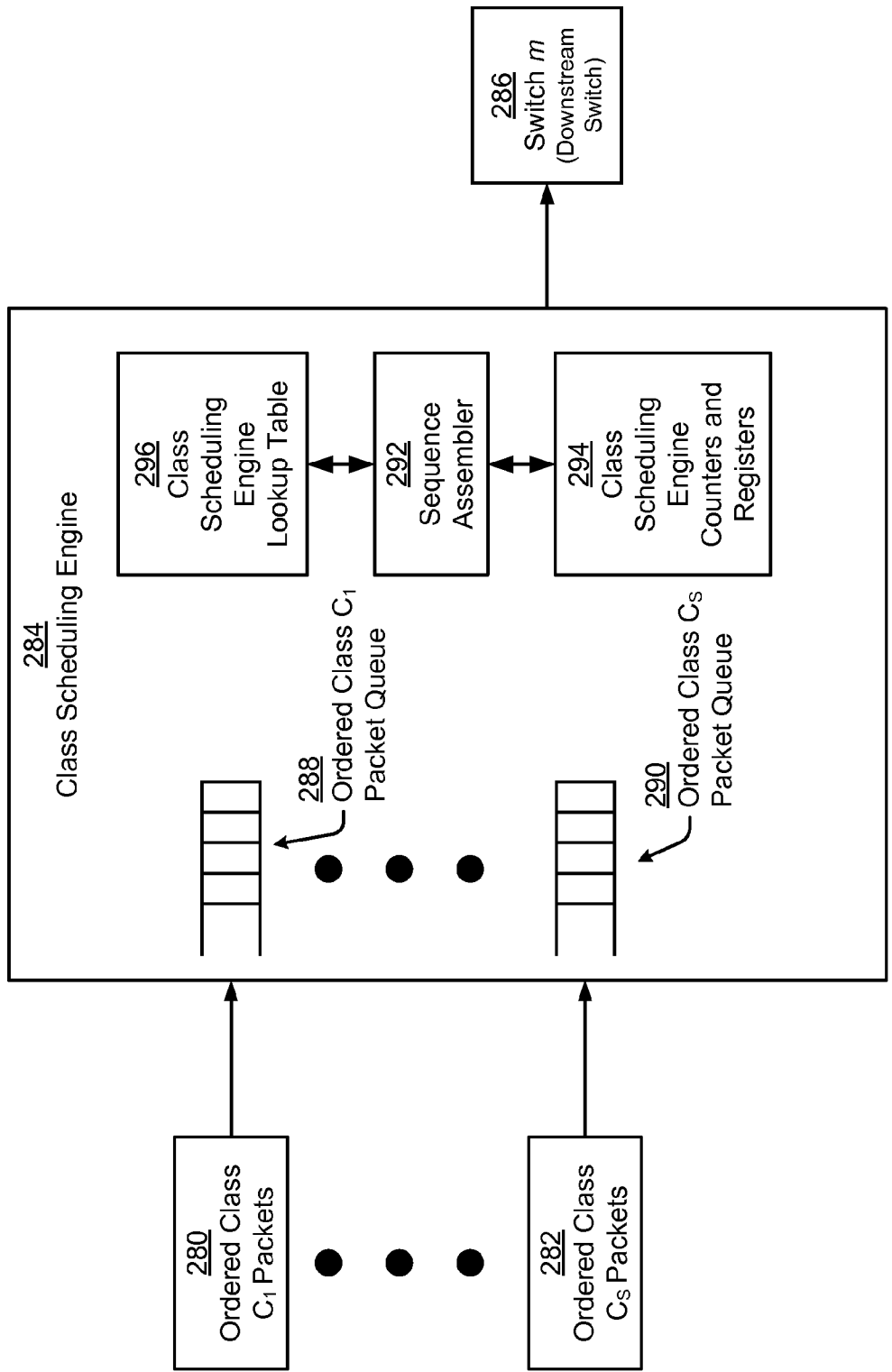
Figure 7:
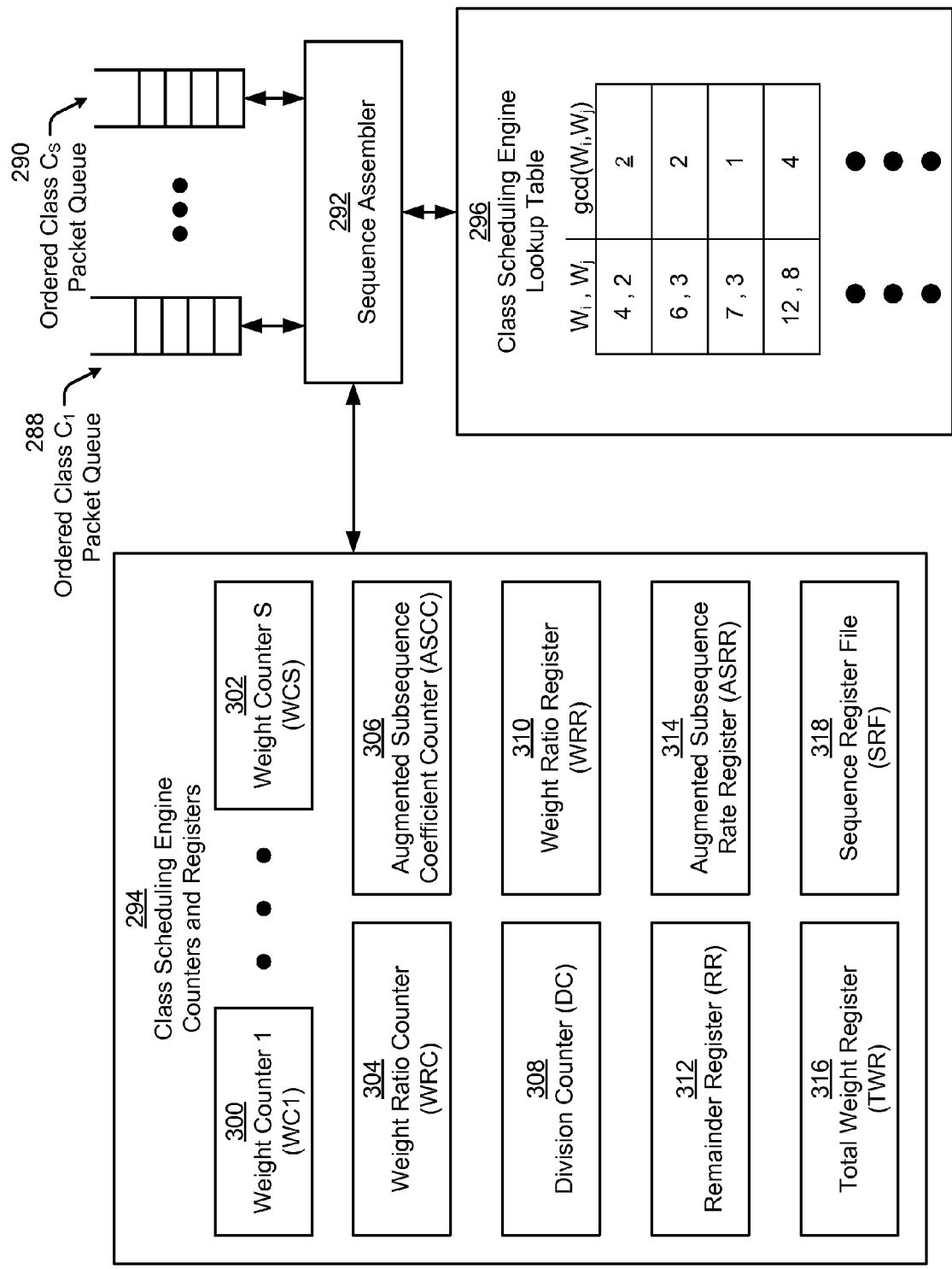

FIGS. 6 and 7 show a schematic diagram of the class scheduling engine in embodiments of the invention in which the class scheduling engine is implementing a low jitter scheduler. FIG. 6 shows a schematic diagram of the inputs and outputs in accordance with one or more embodiments of the invention.

As shown in FIG. 6 and as discussed above, the inputs to the class scheduling engine are ordered class packets (e.g., ordered class $C_1$ packets (280), ordered class $C_S$ packets (282)) from the packet scheduling engine for each of multiple classes of service. The class scheduling engine (284) forwards the packets to the next downstream switch (i.e., switch m (286) in FIG. 6). The input of packets may be referred to as an input flow and the output of the packets may be referred to as an output flow.

As discussed above with reference to FIGS. 2-6, the class scheduling engine (284) may be implemented using hardware, software, or a combination thereof. Accordingly, the components of the class scheduling engine (284) may correspond to hardware components (e.g., having multiplexers, flip flops, registers, lookup tables, transistors, processors, integrated circuits, etc.), software components, or a combination thereof.

Each class and, therefore, corresponding set of ordered class packets (280, 282) may have a certain priority (i.e., predefined weight). The weight determines how often packets for the particular class will be forwarded. For example, if class $C_1$ has a weight of three and class $C_S$ has a weight of one, then three class $C_1$ packets will be forwarded for every one class $C_S$ packet.

In one or more embodiments of the invention, the class scheduling engine (284) has multiple components including multiple queues (e.g., ordered class $C_1$ packet queue (288), ordered class $C_S$ packet queue (290)), a sequence assembler (292), class scheduling engine counters and registers (294), and a class scheduling engine lookup table (296). In one or more embodiments of the invention, the class scheduling engine lookup table (296) and the class scheduling engine counters and registers (294) are part of the sequence assembler (292). Further, the ordered class packet queues (288, 290), the sequence assembler (292), the class scheduling engine counters and registers (294), and the class scheduling engine lookup table (296) may each be implemented in any combination of hardware or software. Each component of the class scheduling engine (284) is discussed below.

In one or more embodiments of the invention, similar to the queues in FIGS. 2-4, the ordered class packet queues (288, 290) are used to temporarily store (i.e., buffer) incoming packets received from the packet scheduling engine. In one or more embodiments of the invention, the ordered class packet queues (288, 290) may be located outside the class scheduling engine (284) on the switch. The class scheduling engine counter and registers (294) may store and modify values used by the sequence assembler (292). The class scheduling engine lookup table (296) stores values that may be accessed by the sequence assembler (292).

In one or more embodiments of the invention, the sequence assembler (292) is configured to assemble a sequence of packets according to a scheduling algorithm. The scheduling algorithm determines the sequence of packets from each ordered class packet queue (288, 290) to be forwarded (i.e., outputted) to switch m (286). In one or more embodiments of the invention, the sequence of packets may be temporary stored (i.e., buffered) in an output queue (not shown) located either within the class scheduling engine (284) or external to the class scheduling engine (284). In one or more embodiments of the invention, the scheduler stores instructions dictating the order in which the packets from ordered class packet queues (288, 290) are to be forwarded (i.e., the instructions are used to assemble the sequence of packets). In one or more embodiments of the invention, the class scheduling engine (284) does not store a sequence of packets, but instead assembles the sequence of packets concurrently as the packets arrive. The scheduling algorithm may be implemented in software and executed on the sequence assembler (292) in one or more embodiments of the invention. Alternatively, the sequence assembler (292) may include a hardware implementation of the scheduling algorithm.

FIG. 7 shows a more detailed view of the class scheduling engine in one or more embodiments of the invention. Specifically, FIG. 7 shows the sequence assembler (292), class scheduling engine counters and registers (294), a class scheduling engine lookup table (296), and the ordered class packet queues (288, 290) in accordance with one or more embodiments of the invention. The sequence assembler (292), the class scheduling engine counters and registers (294), and the class scheduling engine lookup table (296) are essentially the same as those discussed above in reference to FIG. 6. As shown in FIG. 7, the sequence assembler (292) is operatively connected to the class scheduling engine counters and registers (294), the class scheduling engine lookup table (296), and the ordered class packet queues (288, 290).

As shown in FIG. 7, the class scheduling engine counters and registers (294) include weight counter 1 (WC1) (300), weight counter S (WCS) (302), a weight ratio counter (WRC) (304), an augmented subsequence coefficient counter (ASCC) (306), a division counter (DC) (308), a weight ratio register (WRR) (310), a remainder register (RR) (312), an augmented subsequence rate register (ASRR) (314), a total weight register (TWR) (316), and a sequence register file (SRF) (318). FIG. 7 also shows the class scheduling engine lookup table (296). The class scheduling engine lookup table (296) stores the greatest common divisor (gcd) of predetermined values of two weights. The class scheduling engine counters and registers (294) and the class scheduling engine lookup table (296) are discussed below.

In one or more embodiments of the invention, the WC1 (300) and WCS (302) are hardware counters, each storing the weight of one of the classes of service. Further, WC1 (300) may correspond to the weight (i.e., priority/bandwidth allocation) of the packets assigned to the class $C_1$ arriving at the ordered class $C_1$ packet queue (288) and WCS (302) may correspond to the weight (i.e., priority/bandwidth allocation) of the packets assigned to the class $C_S$ arriving at the ordered class $C_S$ packet queue (290). Accordingly, WC1 (300) may correspond to ordered class $C_1$ packet queue (288). Similarly, WCS (302) may correspond to ordered class $C_S$ packet queue (290). Each weight counter (300, 302) is initially set to the weight (i.e., priority/bandwidth allocation) of the corresponding class in one or more embodiments of the invention. In one or more embodiments of the invention, each weight counter is decremented every time the class scheduling engine forwards a packet from the corresponding class of service. For example, WC1 (301) may be initially set to the weight of class $C_1$ and decrements by one every time the class scheduling engine forwards (i.e., outputs) a packet from ordered class $C_1$ packet queue (288).

In one or more embodiments of the invention, a weight counter (300, 302) initially corresponds to one class of service and later, as dictated by the class scheduling engine, corresponds to a different class of service (i.e., the weight counter switches class of service associations). For example, WC1 (300) may initially correspond to class $C_1$ and then, as dictated by the class scheduling engine, switch to a different class (e.g., class $C_S$). In one or more embodiments of the invention, the class scheduling engine assigns the class of service with the larger weight WC1 (300), while the class scheduling engine assigns the class of service with the smaller weight (i.e., lower priority) to WCS (302).

The class scheduling engine generates and forwards a sequence of packets selected from the ordered class $C_1$ packet queue (288) and the ordered class $C_S$ packet queue (290). In the rest of this specification, the ordered class $C_i$ packet queue (not shown) stores packets of class $C_i$ having $W_i$. Similarly, the ordered class $C_j$ packet queue (not shown) stores packets of class $C_j$ having weight $W_j$. Further, WC1 corresponds to packets of class $C_i$ while WC2 (not shown in FIG. 7) corresponds to packets of class $C_j$. Further still, $W_i$ is greater or equal to $W_j$.

In one or more embodiments of the invention, the WRC (304) is a hardware counter that decrements by one every time a packet from class $C_i$ is forwarded. Accordingly, every time WC1 (300) is decremented by one, the WRC (304) is also decremented by one.

In one or more embodiments of the invention, the ASCC (306) is a hardware counter that decrements by one when a subsequence of packets is assembled. A subsequence of packets may be a section (i.e., subset or portion) of the sequence of packets forwarded by the class scheduling engine that includes at least one packet from class $C_i$ and one packet from class $C_j$. In one or more embodiments of the invention, the subsequence is made up of packets stored in an internal queue (not shown). In one or more embodiments of the invention, the subsequence stores the order of packets in which the packets are to be forwarded. In one or more embodiments of the invention, the class scheduling engine does not store a subsequence of packets or a subsequence of instructions, but instead forwards the subsequence concurrently as the packets arrive.

In one or more embodiments of the invention, the DC (308) is a hardware counter that is initially set to $W_j$ and is incremented by $W_j$ until the value of the DC is greater than $W_i$. For example, if $W_i$ is equal to 10 and $W_j$ is equal to 4, the DC (308) will increment two times to the values of 8, and 12, stopping at 12 as it is greater than 10. The DC (308) increments a number of times equal to floor($W_i/W_j$)=$\lfloor W_i/W_j \rfloor$. Accordingly, the final value that the DC (308) stores is $W_j \times$floor($W_i/W_j$). The DC (308) is further described below in reference to FIG. 15 and FIG. 17.

In one or more embodiments of the invention, the weight ratio register (WRR) (310) and the augmented subsequence rate register (ASRR) (314) are hardware registers that hold values for restoring the WRC (304) and ASCC (306), respectively. In other words, the registers (308, 310) may store the "old" or previous values of the corresponding counters (304, 306). In one or more embodiments of the invention, the registers (308, 310) are updated independently of the corresponding counters (304, 306). In one or more embodiments of the invention, the WRR (310) is set to WRR=floor($W_i/W_j$)=$\lfloor W_i/W_j \rfloor$. In one or more embodiments of the invention, the remainder register (RR) (312) is a hardware register storing the value RR=$W_i-W_j \times$WRR. In one or more embodiments of the invention, the ASRR (314) is set to ASRR=floor($W_j$/RR)=$\lfloor W_j/RR \rfloor$.

In one or more embodiments of the invention, the total weight register (TWR) (316) is a hardware register that stores a summation of the weights corresponding to all flows that have been scheduled by the scheduler. The sequence register file (SRF) (318) may be a hardware register file or hardware, software, or combination thereof (e.g., an instruction set executing on a hardware component) that may store the instructions necessary to forward packets from the ordered class packet queues (288, 290) in a particular sequence as obtained by the low jitter scheduling algorithm. For example, the instructions may dictate the order in which the packets in queues (288, 290) are to be popped and forwarded. In one or more embodiments of the invention, the TWR (316) stores the length of the sequence stored in the SRF (318).

Still referring to FIG. 7, the class scheduling engine lookup table (296) stores the greatest common divisor (gcd) of several combinations of predetermined values of $W_i$ and $W_j$. For example, if $W_i$ equals 4 and $W_j$ equals 2, $\gcd(W_i, W_j)=\gcd(4, 2)=2$. As yet another example, if $W_i$ equals 12 and $W_j$ equals 8, $\gcd(12,8)=4$. In one or more embodiments of the invention, accessing the class scheduling engine lookup table (296) requires less time and fewer resources than calculating the greatest common divisor of two numbers. Accordingly, by creating the class scheduling engine lookup table (296) prior to running a process (i.e., the scheduling algorithm) requiring the greatest common divisor of two numbers, computational time and resources are saved.

FIGS. 8-18 show flowcharts in accordance with one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, determination steps and identification steps may or may not require a hardware to process an instruction in accordance with one or more embodiments of the invention. Thus, the hardware is considered to perform the steps when the hardware has access to any information that the hardware was to obtain from the steps.

Figure 8:
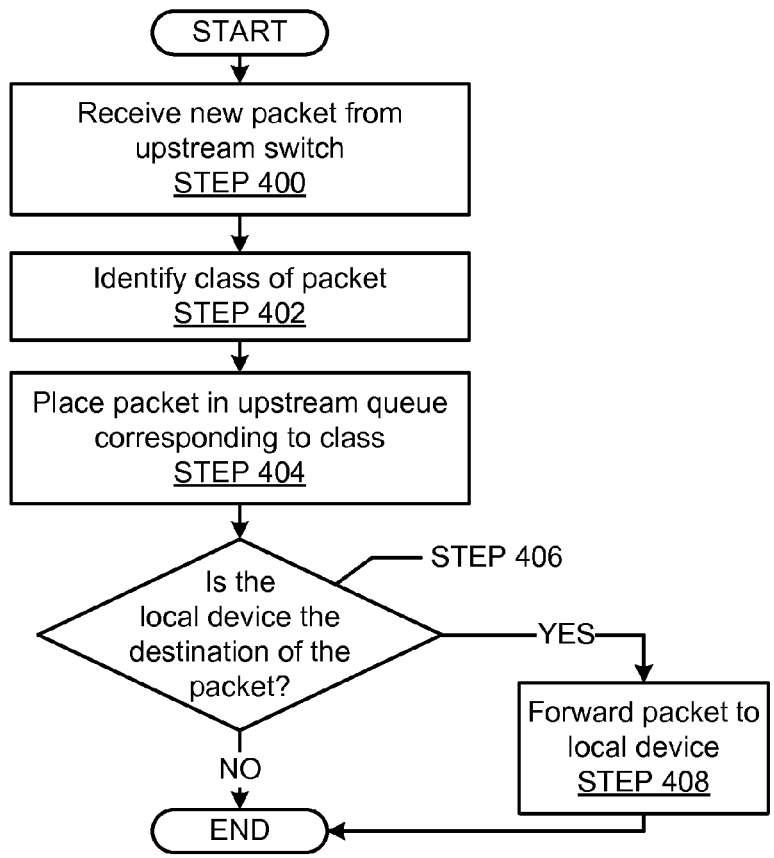
FIGS. 8-18 show flowcharts in accordance with one or more embodiments of the invention.

FIGS. 8-11 shows flowcharts for processing packets by a switch to forward the packets to a local device or a downstream device in one or more embodiments of the invention. FIG. 8 shows a flowchart for processing a packet received from an upstream switch.

In STEP 400, a packet is received from an upstream switch. The packet may be generated by any device. The packet may be assigned a class of service by an upstream device that generated the packet, by an upstream switch that is connected to the upstream device that generated the packet, or by another component.

Rather than the packet being received from an upstream switch, if the local switch is an end switch in the daisy chain interconnect, the packet may be received from an external device or external chip, which is external to the chip having the local switch. In such a scenario, for the purpose of the discussion below, the external device or external chip may be treated as an upstream switch.

In STEP 402, the class of the packet is identified. Identifying the class of the packet may be performed, for example, by reading a class identifier in the header of the packet. Based on the class, in STEP 404, the packet is placed in the upstream queue corresponding to the class assigned to the packet. In one or more embodiments of the invention, the packet is placed at the end of the upstream queue. In one or more embodiments of the invention, STEPS 402 and 404 may be omitted in embodiments of the invention in which only a single upstream queue exists.

In STEP 406, a determination is made whether the local device is the destination of the packet. The destination of the packet may be determined based on the header of the packet. Specifically, if the destination identifier in the header of the packet identifies the local device, then the packet is determined to be a local packet. In STEP 408, if the packet is determined to be a local packet, then the packet is forwarded to the local device. For example, the routing engine, discussed above, may forward the packet. In some embodiments of the invention, Steps 402 and 404 may be performed after performing Steps 406 and 408. Specifically, determining the class of service and placing packets in an upstream queue may be performed only for those packets having a remote destination.

Figure 9:
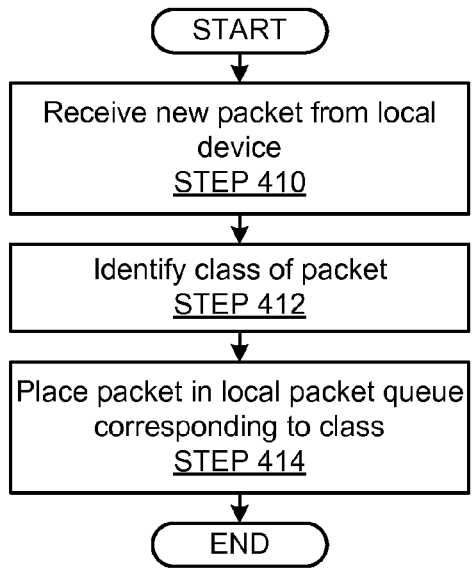

FIG. 9 shows a flowchart for receiving packets from a local device in one or more embodiments of the invention. In STEP 410, a new packet is received from the local device connected to the local switch. In STEP 412, the class of the packet is identified. As discussed above, the class of the packet may be identified from the header of the packet in one or more embodiments of the invention. Alternatively or additionally, the class of the packet may be defined based on the local device. For example, the local device may be associated with a particular class of service, in which all packets from the local device are associated with the particular class of service. In such a scenario, a class of service identifier may be added to the header of the packet. In STEP 414, the packet is placed in the local packet queue corresponding to the class.

Figure 10:
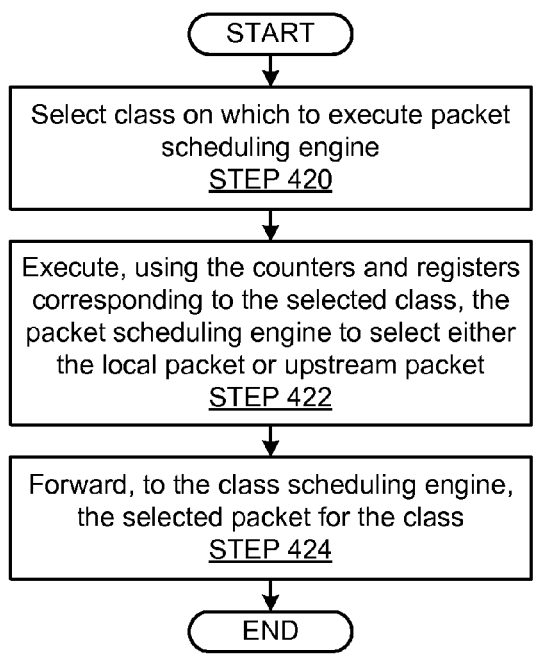

FIG. 10 shows a flowchart for scheduling packets on the UPQs and LPQs in one or more embodiments of the invention. In STEP 420, the class of service on which to execute the packet scheduling engine is selected in one or more embodiments of the invention. The packet scheduling engine may select the class of service in a round robin fashion, based on the number of packets in the ordered class packet queue corresponding to the class, or based on other criteria. Alternatively, if a separate packet scheduling engine exists for each class of service, then STEP 420 may not be executed in one or more embodiments of the invention.

In STEP 422, the packet scheduling engine executes to select either a local packet or an upstream packet assigned to the class using the counters and registers corresponding to the class. As an overview, for a particular class of service, the packet scheduling engine inserts, according to an insertion rate, one or more local packets between subsets of upstream packets. Each subset may include one or more upstream packets. The insertion is performed concurrently with forwarding the packets. Specifically, for each timeslot, the packet scheduling engine may forward a local packet or an upstream packet. The result of the forwarding is an ordered set of packets having local packets in between subsets of upstream packets. Further, in one or more embodiments of the invention, the insertion rate may change. Executing the packet scheduling engine is discussed below and in FIGS. 12-14 in one or more embodiments of the invention. In one or more embodiments of the invention, the packet scheduling engine schedules a predefined number of packets or packets for a predefined amount of time before switching to the next class of service.

Continuing with FIG. 10, in STEP 424, the selected packet for the particular class is forwarded to the class scheduling engine. The selected packet may be a local packet or an upstream packet. Further, the packet scheduling engine may forward the packet by placing the packet in an ordered class packet queue in one or more embodiments of the invention.

Figure 11:
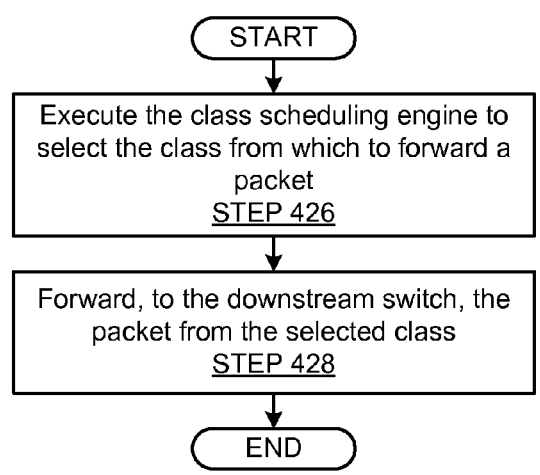

FIG. 11 shows a flowchart for the class scheduling engine to execute in one or more embodiments of the invention. In STEP 426, the class scheduling engine executes to select the class of service in which to forward a packet to a downstream switch. In one or more embodiments of the invention, the packet scheduling engine selects the class of service from a set having all classes of service managed by the switch. As discussed above, the class scheduling engine may implement any of a variety of scheduling algorithms when executing. For example, the class scheduling engine may implement a weighted round robin algorithm in which the class scheduling engine selects a predefined number of packets from the current class before forwarding on the next class, and so forth. As another example, the class scheduling engine may implement a low jitter scheduler. Executing the class scheduling engine that implements a low jitter scheduler is discussed below with reference to FIGS. 15-18.

Continuing with FIG. 11, in STEP 428, the class scheduling engine forwards the packet to the downstream switch in one or more embodiments of the invention. In one or more embodiments of the invention, the class scheduling engine continually executes such that for each timeslot, the class scheduling engine selects the class of service and forwards the packet.

Figure 12:
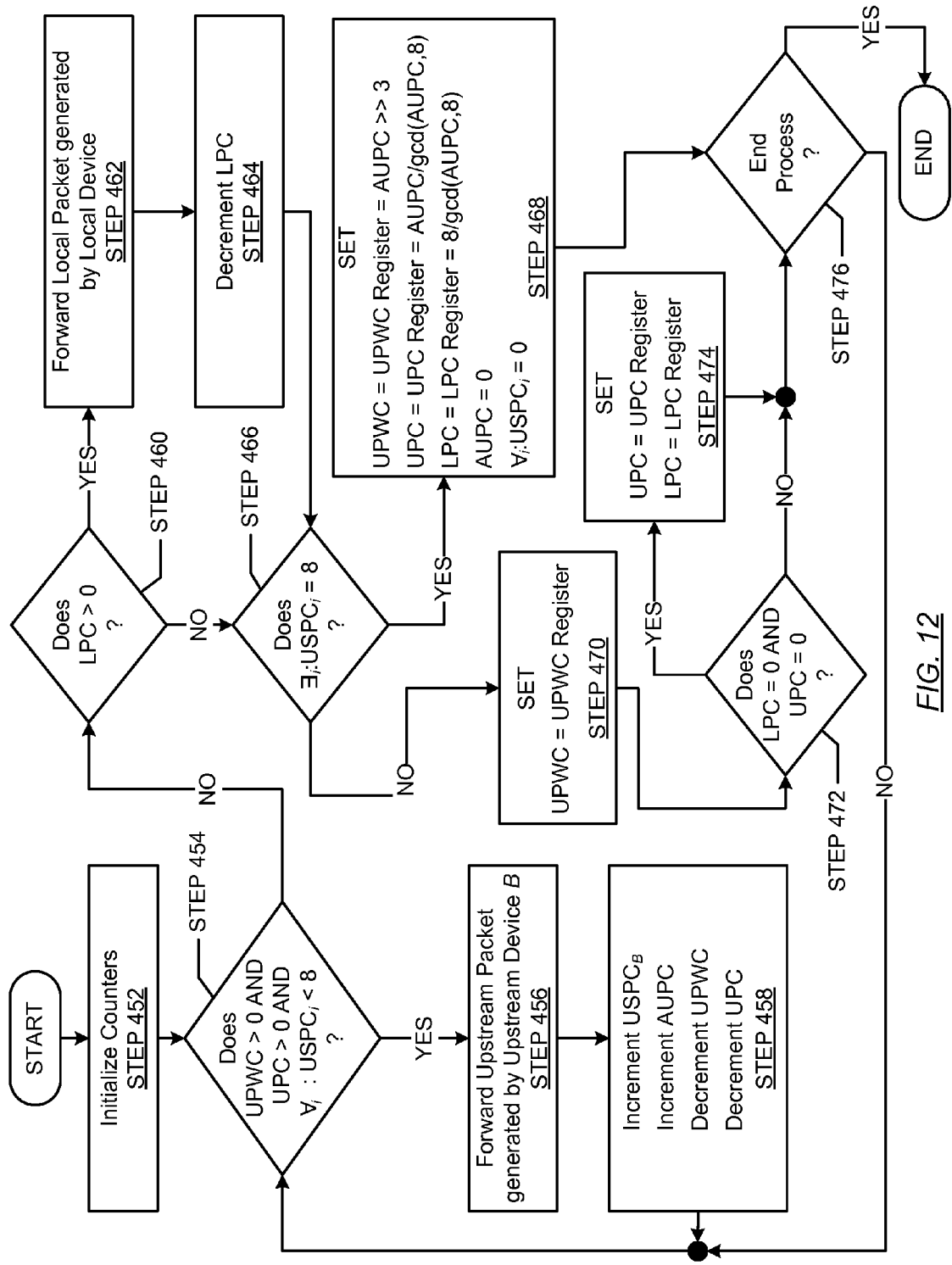
Figure 13:
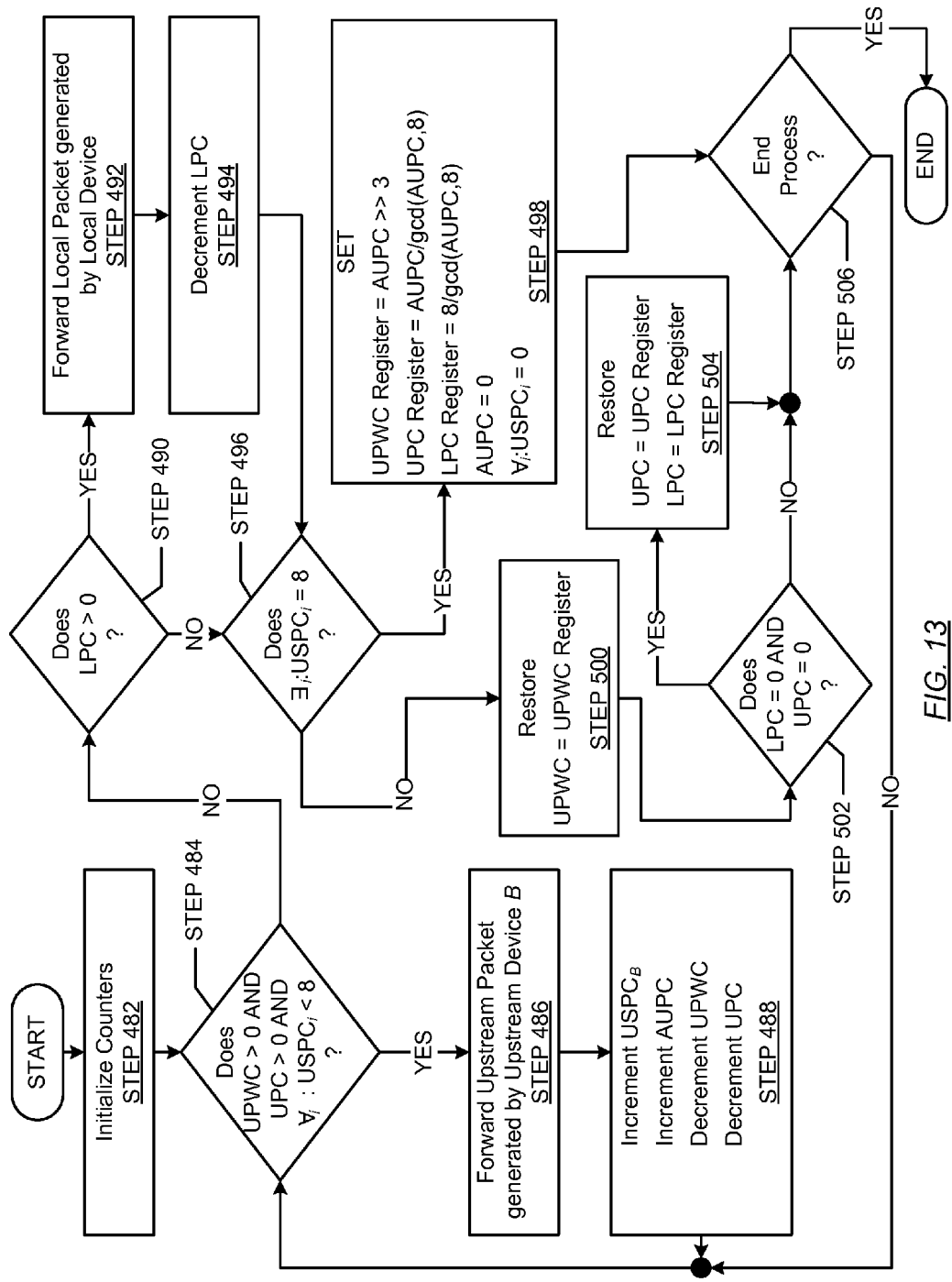
Figure 14:
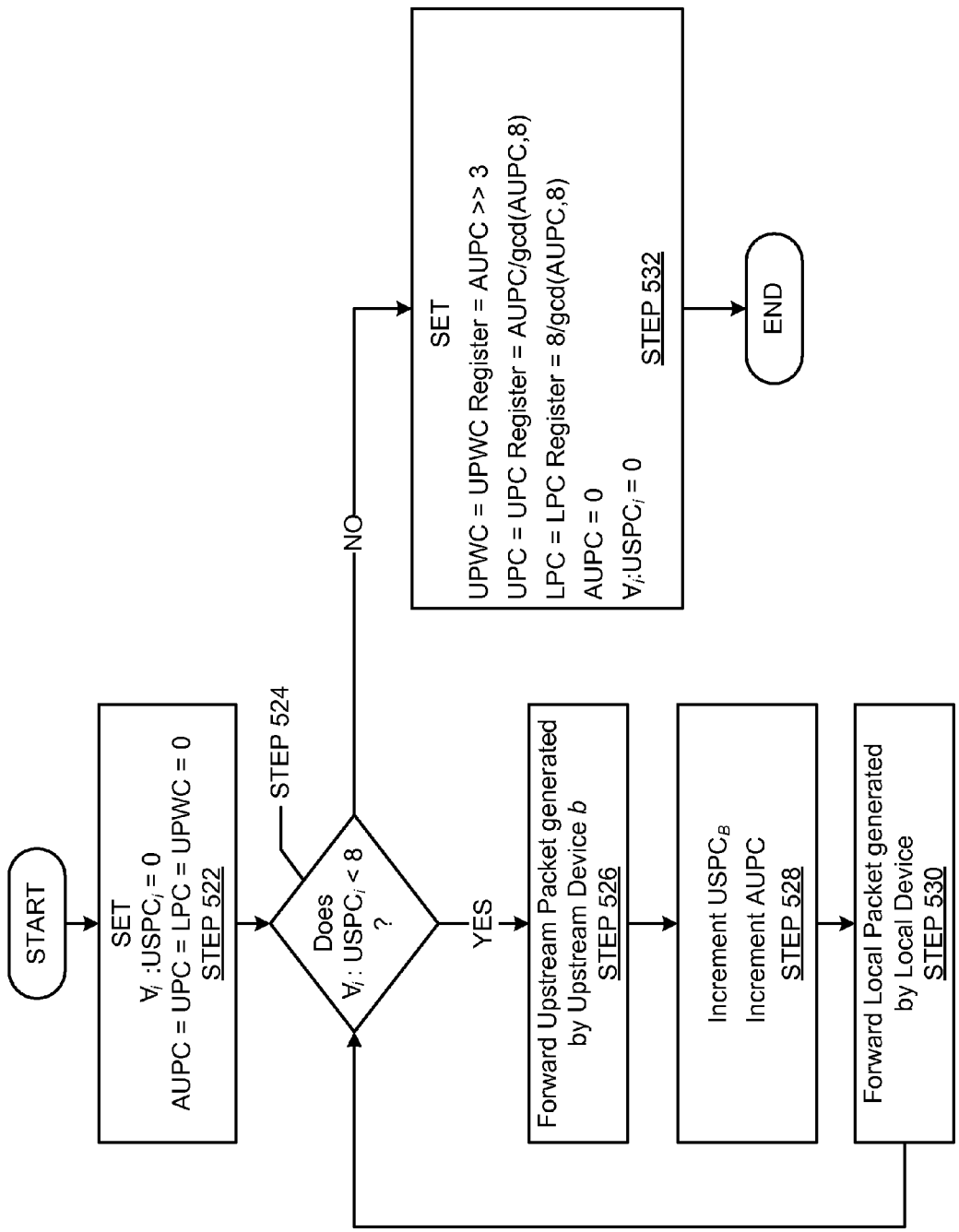

FIGS. 12-14 show flowcharts for the packet scheduling engine to execute in one or more embodiments of the invention. The class of service for which the packet scheduling engine is scheduling packets is referred to in the description below as the current class of service. Turning to FIG. 12, initially, an initialization procedure is executed to reset the values of one or more counters (e.g., LPC, UPC, UPWC, USPC 1, ..., USPC k−1, USPC k, AUPC) (STEP 452). For example, the initialization procedure sets the AUPC and all the USPCs to zero (i.e., USPC 1=0, ..., USPC k−1=0, USPC k=0, and AUPC=0). Further, the initialization procedure stores the reset values of the LPC, the UPC, and the UPWC in registers (e.g., LPC Register (274), UPC Register (272), UPWC Register (276)) for subsequent use (discussed below). The initialization procedure is described below with reference to FIG. 14.

In one or more embodiments of the invention, the counters and registers are only initialized initially by the packet scheduling engine. Namely, if the packet scheduling engine stops scheduling packets for the current class of service in order to start scheduling packets for the next class of service, the values of the counters and registers for the current class of service are maintained. Thus, the next time that the packet scheduling engine executes for the current class of service, the packet scheduling may skip STEP 452 and start by executing STEP 454.

In STEP 454, the counters are read to determine whether the UPWC exceeds zero, the UPC exceeds zero, and all USPCs are less than a predetermined value. As discussed above, the predetermined value may correspond to the wrap around value of a USPC (e.g., eight). When it is determined that all conditions of STEP 454 are true, and that upstream packets are present (i.e., the UPQ corresponding to the current class of service is not empty), the process proceeds to STEP 456. Otherwise, when it is determined that at least one of the conditions in STEP 454 is false, or when it is determined that no upstream packets exist to forward (i.e., the UPQ corresponding to the current class of service is empty), the process proceeds to STEP 460.

In STEP 456, an upstream packet, generated by upstream device B, is selected and forwarded. In one or more embodiments of the invention, the selected upstream packet may be the packet at the head of the UPQ corresponding to the current class of service. Thus, for example, if the class of service is class $C_3$, then a packet from the head of $C_3$ UPQ is selected. In one or more embodiments of the invention, the upstream packet may be selected from a random-access memory implementing the UPQ corresponding to the current class of service.

In STEP 458, in response to forwarding the upstream packet, the USPC corresponding to the upstream device that generated the packet (i.e., upstream device B) is incremented by one, the AUPC is incremented by one, the UPWC is decremented by one, and the UPC is decremented by one. The process of FIG. 12 may continuously repeat STEP 456 and STEP 458 during execution for the current class of service until either (i) at least one of the conditions set forth in STEP 454 is false; or (ii) no upstream packets exist (i.e., the UPQ is empty). Accordingly, the number of upstream packets forwarded from the local device to a downstream device depends on the values of the UPC for the current class of service, the UPWC, and each of the USPCs.

In STEP 460, the LPC is read to determine whether the LPC exceeds zero. When it is determined that the LPC exceeds zero and at least one local packet exists (i.e., the LPQ corresponding to the current class of service is not empty), the process proceeds to STEP 462. Otherwise, when it is determined that the LPC is zero or that the LPQ corresponding to the current class of service is empty, the process proceeds to STEP 466.

In STEP 462, a local packet is selected and forwarded. In one or more embodiments of the invention, the local packet is selected from the head of the LPQ corresponding to the current class of service. In one or more embodiments of the invention, the local packet is selected from any location in the LPQ corresponding to the current class of service. In response to forwarding the local packet, the LPC decrements by one (STEP 464).

In STEP 466, it is determined whether at least one USPC equals the predetermined value (e.g., 8). As discussed above, when a USPC reaches eight (or any predetermined value), this implies that eight upstream packets, assigned to the current class of service and generated by the same upstream device, were included in the last N forwarded upstream packets (i.e., N≥8). When it is determined that at least one USPC equals the predetermined value, the process proceeds to STEP 468. When it is determined that none of the USPCs equal the predetermined value, the process proceeds to STEP 470.

In STEP 468, the counters are reset. Specifically, the UPWC is set to UPWC=AUPC>>3; the UPC is set to UPC=AUPC/gcd(AUPC, 8); the LPC is set to LPC=8/gcd(AUPC, 8); the AUPC is set to AUPC=0; and the USPCs are set to USPC 1=0, USPC k−1=0, and USPC k=0. In one or more embodiments of the invention, instead of calculating the greatest common divisor during the execution of STEP 468, the greatest common divisor is determined by accessing a lookup table (e.g., lookup table (260), discussed above in reference to FIG. 5) storing required greatest common divisors.

As discussed above, the LPC Register, the UPC Register, and the UPWC Register are initially set up by the initialization process (STEP 452). In STEP 468, these registers are upgraded such that the LPC Register is set to LPC Register=8/gcd(AUPC, 8), the UPC Register is set to UPC Register=AUPC/gcd(AUPC, 8), and the UPWC Register is set to UPWC Register=AUPC>>3. At a subsequent time in the process of FIG. 12, the LPC, the UPC, and/or the UPWC may be restored to the values in the LPC register, the UPC register, and the UPWC register, respectively.

Alternatively, in STEP 470 the old value of UPWC is restored. In other words, the UPWC is set to UPWC=UPWC Register before proceeding to STEP 472. As discussed the UPWC register is initially set by the initialization process (STEP 452) and may be later modified by STEP 468.

In STEP 472, the LPC and the UPC are read to determine if both the LPC and the UPC equal zero. When it is determined that both the LPC and the UPC are zero (i.e., LPC=UPC=0), the process proceeds to STEP 474. Otherwise, when it is determined that the LPC exceeds zero and/or the UPC exceeds zero, the process proceeds to STEP 476.

In STEP 474, the old values of the UPC and the LPC are restored. In other words, UPC is set to UPC=UPC Register and LPC is set to LPC=LPC Register, before proceeding to STEP 476. As discussed above, the UPC Register and the LPC register are initially set by the initialization process (STEP 452) and may be later modified by STEP 468. After STEP 472 or STEP 474, the process returns to STEP 454 (i.e., the process executes in a loop). Alternatively, execution of the process may be ended (e.g., by a user) (i.e., STEP 456). In one or more embodiments of the invention, STEP 456 is omitted. In such embodiments, STEP 454 is immediately executed following STEP 468, STEP 472, or STEP 474.

In view of the fairness protocol shown in FIG. 12, once the UPC, the LPC, and the UPWC are updated (i.e., STEP 452 or STEP 468), |UPWC| upstream packets are processed back-to-back, each time decrementing the UPWC and the UPC by one (i.e., STEP 456 and STEP 458). Next, the scheduler processes one local packet and decrements the LPC by one (i.e., STEP 462 and STEP 464). The pattern of forwarding multiple upstream packets followed by a single local packet repeats until either (i) LPC=UPC=0 (i.e., STEP 472); or (ii) at least one USPC=8 (i.e., STEP 466). Regardless of whether (i) or (ii) is true, the UPWC is set to (a possibly new) value of APUC>>3, the UPC is set to APUC, and the LPC is set to 8, both reduced (i.e., divided) by gcd(AUPC, 8) (i.e., STEP 468).

As shown in FIG. 12, if only the LPC drops to a value of zero, the fairness protocol of FIG. 12 exclusively services remote packets, decrementing the UPC each time the fairness protocol forwards an upstream packet until the UPC is zero. Further, as soon as at least one USPC reaches 8, all counters are recalculated based on the new value of the AUPC.

FIG. 13 shows another flowchart for packet scheduling engine to execute in accordance with one or more embodiments of the invention. In one or more embodiments of the invention, STEPS 482, 484, 486, 488, 490, 492, 494, 496, 500, 502, 504, and 506, are essentially the same as STEPS 452, 454, 456, 458, 460, 462, 464, 466, 470, 472, 474, and 476, respectively (discussed above in reference to FIG. 12). Further, as discussed above in reference to FIG. 12, the LPC Register, the UPC Register, and the UPWC Register are registers initially set up by the initialization process (STEP 482). In STEP 498, these registers, but not their corresponding counters, are updated such that the LPC Register is set to LPC Register=8/gcd(AUPC, 8), the UPC Register is set to UPC Register=AUPC/gcd(AUPC, 8), and the UPWC Register is set to UPWC Register=AUPC>>3. Further, the AUPC is set to AUPC=0 and the USPCs are set to USPC 1=0, . . . , USPC k−1=0, and USPC k=0. In one or more embodiments of the invention, instead of calculating the greatest common divisor during the execution of STEP 418, the greatest common divisor is determined by accessing a lookup table (e.g., lookup table (260), discussed above in reference to FIG. 5) storing required greatest common divisors.

In view of the fairness protocol shown in FIG. 13, once the UPC, the LPC, and the UPWC are updated (i.e., STEP 482, STEP 500, STEP 504), |UPWC| upstream packets are processed back-to-back, each time decrementing the UPWC and the UPC by one (i.e., STEP 486 and STEP 488). Next, the scheduler processes one local packet and decrements the LPC by one (i.e., STEP 492 and STEP 494). The pattern of forwarding multiple upstream packets followed by a single local packet repeats until either (i) LPC=UPC=0 (i.e., STEP 422); or (ii) at least one USPC=8 (i.e., STEP 496). If (i) is true, the LPC and the UPC are restored to values in the LPC Register and the UPC Register, respectively (i.e., STEP 504). If (ii) is true, the LPC Register, the UPC Register, and the UPWC Register are updated (i.e., STEP 498).

FIG. 14 is a flowchart for initializing the counters and registers as described in STEP 452 (discussed above in reference to FIG. 12) and STEP 482 (discussed above in reference to FIG. 13). Initially, all counters are set to zero (i.e., AUPC=0, UPC=0, LPC=0, UPWC=0, USPC 1=0, USPC k−1=0, USPC k=0) (STEP 522). In STEP 524, it is determined whether all of the USPCs are less than a predetermined value. For example, the predetermined value may be eight and correspond to the wrap around value of a 3-bit USPC. When it is determined that all the USPCs are less than 8, and that the UPQ has at least one upstream packet (i.e., the UPQ is non-empty) or the LPQ has at least one local packet (i.e., the LPQ is non-empty), the process proceeds to STEP 526. Otherwise, when it is determined that at least one USPC exceeds 7, the process proceeds to STEP 532.

In STEP 526, an upstream packet for the current class of service is selected and forwarded. In one or more embodiments of the invention, the selected upstream packet may be the packet at the head of the UPQ corresponding to the current class of service. As discussed above, an upstream packet is generated by one of the upstream devices (i.e., Upstream Device b, where b ⊂ {1, 2, . . . , k−1, k}).

In STEP 528, both the AUPC and the USPC b (i.e., the USPC corresponding to the upstream device b) increment by one in response to forwarding the upstream packet. In one or more embodiments of the invention, STEP 406 and STEP 408 may be omitted if the UPQ is empty.

In STEP 530, a local packet is forwarded (e.g., from the LPQ corresponding to the current class of service) and the process returns to STEP 524. In the event the LPQ corresponding to the current class of service is empty, STEP 530 may be omitted. Further, STEP 506, STEP 508, and STEP 510 continuously repeat until at least one USPC equals or exceeds 8. In the event the LPQ corresponding to the current class of service is empty, the process of FIG. 14 services (i.e., forwards) only upstream packets corresponding to the current class of service while executing for the current class of service. Similarly, in the event the UPQ corresponding to the current class of service is empty, the process of FIG. 14 services (i.e., forwards) only local packets corresponding to the current class of service.

As discussed above, when the condition(s) of STEP 524 are false, the process proceeds to STEP 532. STEP 532 is essentially the same as STEP 498, discussed above in reference to FIG. 13. As shown in FIG. 14, in STEP 532, the counters are reset. Specifically, the UPWC is set to UPWC=AUPC>>3; the UPC is set to UPC=AUPC/gcd (AUPC, 8); the LPC is set to LPC=8/gcd(AUPC, 8); the AUPC is set to AUPC=0; and the USPCs are set to USPC 1=0, . . . , USPC k−1=0, and USPC k=0. As discussed above, instead of calculating the greatest common divisor during the execution of STEP 598, the greatest common divisor is determined by accessing a lookup table (e.g., lookup table (260), discussed above in reference to FIG. 5).

In addition to resetting the counter, multiple registers (i.e., the LPC Register, the UPC Register, and the UPWC Register) are set as shown in STEP 532. As discussed above, these registers may be used to restore the values of the LPC, the UPC, and the UPWC during operation of the process shown in FIG. 12. Following, execution of STEP 532, the process ends.

The process shown in FIG. 14 initially sets all counters to zero. Then, as long as none of the USPCs have reached eight, an upstream packet is forwarded (i.e., providing an upstream packet is available), the AUPC and corresponding USPC increment in response to forwarding the upstream packet, and a local packet is forwarded (i.e., providing a local packet is available). When at least one of the USPCs reach eight, values for the UPWC, the UPC, and the LPC are calculated, and the USPCs and AUPC are set to zero.

During the process of FIG. 14, there is no effort to achieve a "fair" allocation of bandwidth between local and upstream packets corresponding to the current class of service. This unfairness lasts for most the maximum value of AUPC packets (e.g., 127 packets when the AUPC is 8-bits).

Figure 15:
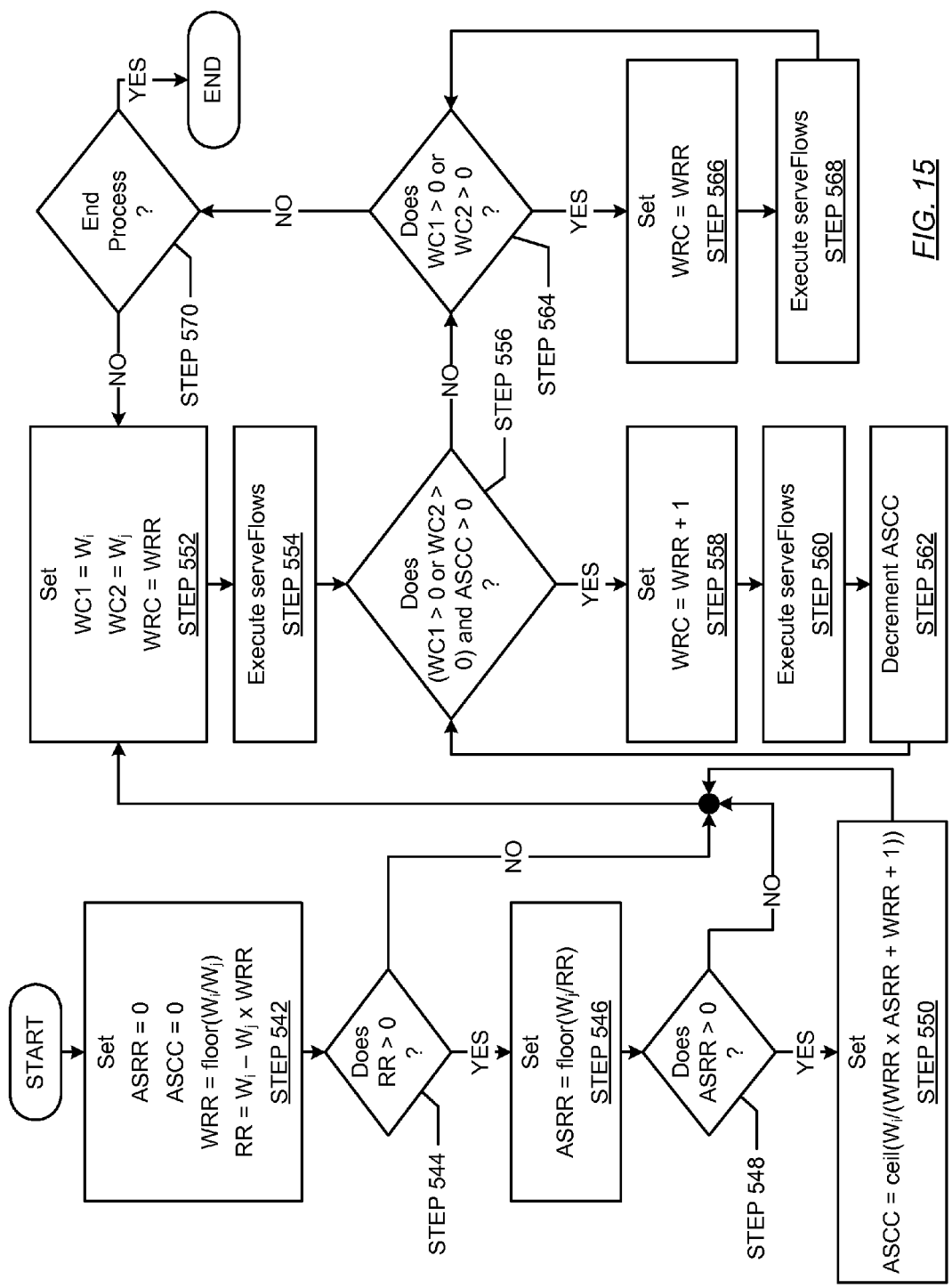

FIGS. 15-18 show flowcharts for the class scheduling engine to implement a low jitter scheduler in accordance with one or more embodiments of the invention. Turning to FIG. 15, the process shown in FIG. 15 may be used to assemble and forward a sequence of packets assigned class $C_i$ having weight $W_i$ and packets assigned class $C_j$ having weight $W_j$. Although FIGS. 15-18 only show two classes, the class scheduling engine may include functionality to schedule packets assigned to more than two classes using the process similar to shown in FIGS. 15-18 without departing from the scope of the invention.

In one or more embodiments of the invention, the class scheduling engine may set and modify the values of one or more counters (e.g., WC1, WC2, WRC, ASCC, DC). In one or more embodiments of the invention, the scheduling algorithm may store calculated values in registers (e.g., WRR, RR, ASRR, TWR) and register files (e.g., SRF). In one or more embodiments of the invention, a weight ratio is stored in the WRR.

Initially, the values of the ASRR and the values of the ASCC are reset to zero (STEP 542). Further, the value of the WRR is set to WRR=floor($W_i/W_j$)=$\lfloor W_i/W_j \rfloor$. The result of $\lfloor W_i/W_j \rfloor$ may be referred to as a weight ratio. The value of the RR is set to RR=$W_i-W_j\times$WRR. The result of $W_i-W_j\times$WRR may be referred to as an augmented subsequence factor. As discussed above in reference to FIG. 7, the DC may effectively store the value $W_j\times$floor($W_i/W_j$)=$W_j\times$WRR after the DC stops incrementing. Accordingly, the DC may be used for calculating the value of the WRR and the value of the RR.

In STEP 544, the RR is read to determine whether the RR exceeds zero. When it is determined that the RR exceeds zero, the process proceeds to STEP 546. Otherwise, when it is determined that the RR does not exceed zero, the process proceeds to STEP 552. In STEP 546, the ASRR is set to ASRR=floor($W_j$/RR) and the process proceeds to STEP 548. In STEP 548, the ASRR is read to determine whether the ASRR exceeds zero. When it is determined that the ASRR exceeds zero, the process proceeds to STEP 550. Otherwise, when it is determined that the ASRR does not exceed zero, the process proceeds to STEP 552. In STEP 550, the ASCC is set to ASCC=ceil($W_i$/(WRR$\times$ASRR+WRR+1))=$\lceil W_i$/(WRR$\times$ASRR+WRR+1)$\rceil$, and the process proceeds to STEP 552. The result of $\lceil W_i$/(WRR$\times$ASRR+WRR+1)$\rceil$ may also be referred to as an augmented subsequence factor. In one or more embodiments of the invention, STEP 544 exists to prevent a division by zero in STEP 546. In one or more embodiments of the invention, an augmented subsequence factor is stored in the ASCC.

In STEP 552, the remaining counters WC1, WC2, and the WRC are set to the initial values. As discussed above, the initial values of the WC counters is the corresponding weight. The initial value of the WRC count is the value in the WRR register. Specifically, WC1 is set to WC1=$W_i$, WC2 is set to WC2=$W_j$, and the WRC is set to WRC=WRR.

In STEP 554, a procedure serveFlows is executed, which assembles and forwards a regular subsequence of packets. A regular subsequence contains a number of packets from class $C_i$ equal to the value of the WRR and one packet from class $C_j$. The serveFlows procedure may read and modify counters WC1, WC2, and WRC. The serveFlows procedure is further described below in reference to FIG. 16.

In STEP 556, the ASCC, WC1, and WC2 are read to determine if the ASCC exceeds 0 and whether at least one of WC1 and WC2 exceeds zero. When it is determined that all conditions of STEP 556 are true, the process proceeds to STEP 558. Otherwise, when it is determined that at least one of the conditions in STEP 556 is false, the process proceeds to STEP 564.

In STEP 558, the value of the WRC is restored to WRC=WRR+1. As discussed above, serveFlows may modify WRC in STEP 554. In STEP 560, serveFlows is executed and an augmented subsequence is assembled and forwarded. An augmented subsequence contains a number of packets from class $C_i$ equal to the value of WRR augmented by one (i.e., WRR+1) and one packet from Class $C_j$. In response to assembling and forwarding an augmented subsequence, the ASCC is decremented by one (STEP 562). After STEP 562, the process returns to STEP 556.

The process of FIG. 15 may continually repeat STEP 558, STEP 560, and STEP 562 until at least one of the conditions set forth in STEP 556 is false, effectively assembling and forwarding a set of augmented subsequences. Accordingly, the set of augmented subsequences assembled and forwarded has a cardinality that depends on the values of WC1, WC2, and the ASCC. In one or more embodiments of the invention, the number of augmented subsequences assembled and forwarded is equal to the initial value of the ASCC as set in STEP 550.

In STEP 564, WC1 and WC2 are read to determine whether at least one of WC1 and WC2 exceeds zero. When it is determined that at least one of WC1 and WC2 exceeds zero, the process proceeds to STEP 566. Otherwise, when it is determined that both WC1 and WC2 do not exceed zero, the process proceeds to STEP 570.

In STEP 566, the value of the WRC is restored to WRC=WRR. In STEP 568, serveFlows is executed and a regular subsequence is assembled and forwarded. The process of FIG. 15 continuously repeats STEP 566 and STEP 568 until the condition set forth in STEP 564 is false, effectively assembling and forwarding a set of regular subsequences. Accordingly, the set of regular subsequences assembled and forwarded has a cardinality that depends on the values of WC1 and WC2.

After STEP 564, the process returns to STEP 552. Alternatively, execution of the process may end (STEP 330). In one or more embodiments of the invention, STEP 570 is omitted. In such embodiments, STEP 552 is immediately executed following STEP 564.

In one or more embodiments of the invention, the length of the sequence forwarded is equal $W_i+W_j$. Further, the sequence may be composed of $W_i$ packets assigned to class $C_i$ and $W_j$ packets assigned to class $C_j$. The last time serveFlows executes in STEP 566 before the condition set forth in STEP 564 is false, the subsequence serveFlows forwards may be different from a regular subsequence or an augmented subsequence because of the constraints imposed on the length and composition of the sequence, as discussed above.

In one or more embodiments of the invention, the jitter of packets from a class may be calculated using interdeparture delays of each packet from each ordered class packet queue. Specifically, the interdeparture delay of a packet assigned to class $C_i$ is equal to number of positions in the sequence before the next packet assigned to class $C_i$. Likewise, the interdeparture delay of a packet assigned to class $C_j$ is equal to the number of positions in the sequence before the next packet assigned to class $C_j$. A calculation of the interdeparture delays is performed on each packet from the resulting sequence with a copy of the same sequence appended to the back of the original sequence. For the sequence $I_1 I_2 J_1 I_3 I_4 I_5 J_2 I_6 I_7 I_8 J_3 I_9 I_{10} J_4$ (i.e., $I_N$=Nth packet assigned to class $C_i$ and $J_N$=Nth packet assigned to class $C_j$), the interdeparture delay calculation will be performed on $I_1 I_2 J_1 I_3 I_4 I_5 J_2 I_6 I_7 I_8 J_3 I_9 I_{10} J_4$–I I J I I I J I I I J I I J. For example, first packet assigned to class $C_i$ (i.e., $I_1$) is directly next to (i.e., one position away) a second packet assigned to class $C_i$ (i.e., $I_2$), and hence the interdeparture delay of the first packet assigned to class $C_i$ is one. In another example, the second packet assigned to class $C_i$ (i.e., $I_2$) is two positions away from the next packet assigned to class $C_i$ (i.e., $I_3$), and hence the interdeparture delay of the second packet assigned to class $C_i$ is two. Accordingly, the interdeparture delays of Flow i for the sequence are 1, 2, 1, 1, 2, 1, 1, 2, 1, and 2. The jitter of a flow in a sequence is obtained by calculating the standard deviation of its interdeparture delays. Accordingly, the jitter of class $C_i$ is 0.49, whereas the jitter of class $C_j$ is 0.50

The packet scheduling engine implementing the low jitter scheduler may schedule packets assigned to class $C_i$ and packets assigned to class $C_j$ in such a way as to achieve low jitter. Consider all permutations of two weights, $W_i$ and $W_j$, such that each weight is less than or equal to $W_{max}$. For example, if $W_{max}$=2, the permutations ($W_i$, $W_j$) are (1, 1), (2, 1), (1, 2), and (2, 2). For $W_{max}$=6, the average jitter of all sequences assembled for all the permutations of weights according the scheduling algorithm in FIG. 15 is 1.15 times lower than the jitter of all sequences assembled by smoothed round robin and 4.55 times lower than the jitter of all sequences assembled by deficit round robin. Similarly, for $W_{max}$=100, the average jitter for all sequences produced for all the permutations of weights according to the scheduling algorithm in FIG. 15 is approximately 1.5 times lower than the jitter of all sequences assembled by smoothed round robin and nearly 19 times lower than the jitter of all sequences assembled by deficit round robin. Thus, as discussed above, the low jitter scheduling algorithm in FIG. 15, in general, assembles sequences with a lower jitter than those sequences assembled by smoothed round robin and deficit round robin. Therefore, the scheduling algorithm of FIG. 15 may be preferable from a quality of service perspective.

Figure 16:
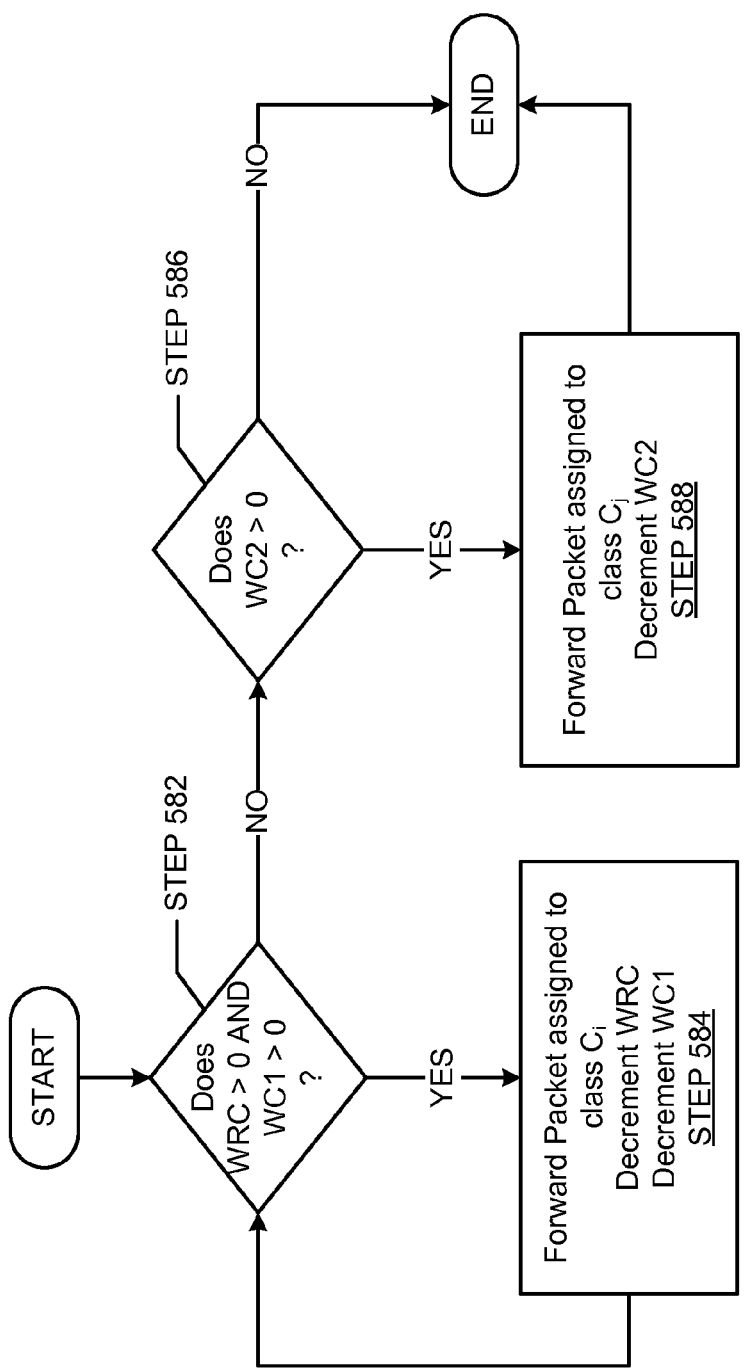

FIG. 16 shows a flowchart in accordance with one or more embodiments of the invention. Specifically, FIG. 16 shows the serveFlows process of Step 554 in FIG. 15. The process shown in FIG. 16 may be used by the packet scheduling engine to assemble and forward a regular subsequence or an augmented subsequence (e.g., STEPS 554, 560, 568 in FIG. 15). Moreover, the process shown in FIG. 16 may access/read any of the counters and/or registers discussed above in reference to FIG. 7.

In STEP 582, the WRC and WC 1 are read to determine whether the WRC exceeds zero and WC1 exceeds zero. When it is determined that all the conditions of STEP 582 are true, the process proceeds to STEP 584. Otherwise, when it is determined that at least one of the conditions in STEP 582 is false, the process proceeds to STEP 586. In STEP 584, one packet assigned to class $C_i$ is forwarded. In response, the WRC is decremented by one and WC1 is decremented by one. After STEP 584, the process returns to STEP 582. The process of FIG. 16 may continuously repeat STEP 584 until at least one condition set forth in STEP 582 is false. Accordingly, the number of packets forwarded that are assigned to class $C_i$ depends on the values of the WRC and WC1.

In STEP 586, WC2 is read to determine whether WC2 exceeds zero. When it is determined that WC2 exceeds zero, the process proceeds to STEP 588. Otherwise, when it is determined that WC2 does not exceed zero, the process ends. In STEP 588, one packet assigned to class $C_j$ is forwarded. In response, WC 2 is decremented by one. After STEP 588, the process ends.

As each packet is forwarded in STEP 584 and STEP 588, the packet may instead be placed in an internal queue to be forwarded at a later time, effectively assembling a subsequence of packets. Further, each time a packet is forwarded, instructions identifying the flow queue from which the packet originated may be stored in the SRF, effectively assembling a sequence of instructions corresponding to the order in which the packets in the flow queues (130, 132, 134) are to be forwarded. In one or more embodiments of the invention, STEP 586 and STEP 588 may precede STEP 582 and STEP 584. In other words, a packet assigned to class $C_j$ may be forwarded before a packet assigned to class $C_i$ is forwarded.

In one or more embodiments of the invention, when at least one of class $C_i$ or class $C_j$ does not contain packets to be forwarded (e.g., the queue corresponding to the class is empty or the packet scheduling engine stops sending packets for the class), the scheduling algorithm temporarily suspends computation (i.e., remain in one of the steps in FIG. 16 without advancing to the next step) and retains all stored values (e.g., WC1, WC2, WRC, ASCC, DC, WRR, RR, ASRR, TWR, and SRF). The scheduler may resume computation once both class $C_i$ and class $C_j$ have packets to be forwarded. For example, if class $C_i$ contains no packets to be forwarded, the process may be suspended in STEP 584. Once a packet from Flow i becomes available, the process may resume and proceed to STEP 582, as discussed above. In other words, the scheduling algorithm waits for packets to become available from both flows before proceeding.

In one or more embodiments of the invention, the scheduling algorithm proceeds whether or not both class $C_i$ and class $C_j$ contain packets to be forwarded. For example, if class $C_i$ contains no packets to be forwarded during STEP 584, the scheduling algorithm still decrements WRC and WC1 and then proceeds to STEP 582. In other words, the scheduling algorithm skips the flow that does not contain packets to be forwarded.

Figure 17:
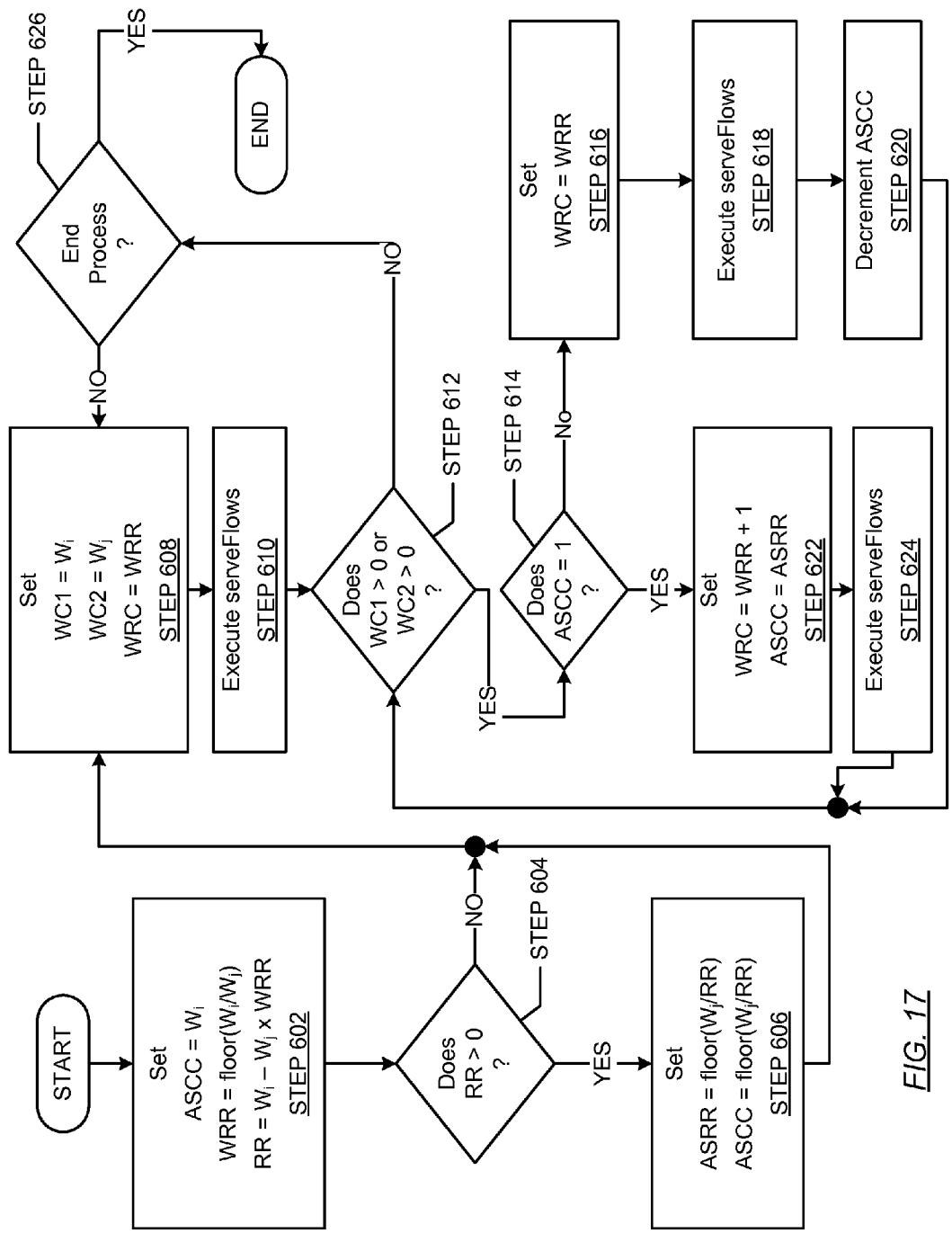

FIG. 17 shows a flowchart in accordance with one or more embodiments of the invention. The process shown in FIG. 17 may be an alternative or additional low jitter scheduler implemented by the class scheduling engine to assemble and forward a sequence of packets assigned to class $C_i$ having weight $W_i$ and assigned to class $C_j$ having weight $W_j$.

In one or more embodiments of the invention, the low jitter scheduler in FIG. 17 may set and modify the values of one or more counters (e.g., WC1, WC2, WRC, ASCC, DC). In one or more embodiments of the invention, the low jitter scheduler may store calculated values in registers (e.g., WRR, RR, ASRR, TWR) and register files (e.g., SRF). In one or more embodiments of the invention, a weight ratio is stored in the WRR.

Initially, the WRR is set to WRR=floor($W_i/W_j$)=$\lfloor W_i/W_j \rfloor$. The result of $\lfloor W_i/W_j \rfloor$ may be referred to as a weight ratio. Further, the ASCC is set to ASCC=$W_i$ and the RR is set to RR=$W_i$−$W_j$×WRR (STEP 602). As discussed above in reference to FIG. 7, the DC may effectively store the value $W_j$×floor($W_i/W_j$)=$W_j$×WRR after the DC stops incrementing. Accordingly, the DC may be used for calculating the value of the WRR and the value of the RR.

In STEP 604, the RR is read to determine whether the RR exceeds zero. When it is determined that the RR exceeds zero, the process proceeds to STEP 506. Otherwise, when it is determined that the RR does not exceed zero, the process proceeds to STEP 608. In STEP 606, the ASRR is set to ASRR=floor($W_j$/RR)=$\lfloor W_j/RR \rfloor$ and ASCC is also set to ASCC=floor($W_j$/RR)=$\lfloor W_j/RR \rfloor$. The result of $\lfloor W_j/RR \rfloor$ may be referred to as an augmented subsequence factor. After STEP 606, the process proceeds to STEP 608. In one or more embodiments of the invention, an augmented subsequence factor is stored in the ASRR.

In STEP 608, the remaining counters, WC1, WC2, and WRC, are set to the corresponding initial values before proceeding to STEP 610 in one or more embodiments of the invention. Specifically, WC1 is set to WC1=$W_i$, WC2 is set to WC2=$W_j$, and the WRC is set to WRC=WRR.

In STEP 610, procedure serveFlows is executed, which assembles and forwards a regular subsequence of packets. The serveFlows procedure may be the same as described above in reference to FIG. 16.

In STEP 612, WC1 and WC2 are read to determine if at least one of WC1 and WC2 exceeds zero. When it is determined that at least one of WC1 and WC2 exceeds zero, the process proceeds to STEP 614. Otherwise, when it is determined that both WC1 and WC2 do not exceed zero, the process proceeds to STEP 626.

In STEP 614, the ASCC is read to determine whether the ASCC exceeds zero. When it is determined that the ASCC exceeds zero, the process proceeds to STEP 620. Otherwise, when it is determined that ASCC does not exceed zero, the process proceeds to STEP 616.

In STEP 616, the value of the WRC is restored to WRC=WRR. As discussed above, serveFlows may modify the WRC in STEP 610. In STEP 618, serveFlows is executed and a regular subsequence is assembled and forwarded. In response to forwarding a regular subsequence, the ASCC is decremented by one (STEP 620). After STEP 620, the process returns to STEP 612. The process of FIG. 17 may continuously repeat STEP 616, STEP 618, and STEP 620 until either the condition set forth in STEP 612 is false and when the ASCC exceeds one (STEP 614). Accordingly, the number of regular subsequences assembled and forwarded depends on the values of WC1, WC2, and the ASCC.

In STEP 622, the value of the WRC is restored to WRC=WRR+1. Further, the ASCC is restored to ASCC=ASRR. In STEP 624, serveFlows is executed and an augmented subsequence is assembled and forwarded. After STEP 624, the process returns to STEP 612. The process of FIG. 17 may continuously repeat STEP 622 and STEP 624 until the condition set forth in STEP 612 is false and when the ASCC does not equal one (STEP 614).

In one or more embodiments of the invention, the process of FIG. 17 generates a pattern of subsequences consisting of a set of regular subsequences with a cardinality equal to the value of the ASRR decremented by one (i.e., ASRR−1) followed by one augmented subsequence. In other words, every Nth forwarded subsequence is an augmented subsequence, where N is equal to the value of ASRR, and every other subsequence is a regular subsequence. This pattern of subsequences is assembled and forwarded until the condition set forth in STEP 612 is false. The sequence of packets is essentially composed of multiple instances of this pattern of subsequences.

After STEP 612, the process returns to STEP 608. Alternatively, execution of the process may be end (i.e., STEP 626). In one or more embodiments of the invention, STEP 626 is omitted. In such embodiments, STEP 608 is immediately executed following STEP 612.

In one or more embodiments of the invention, the length of the sequence forwarded is equal $W_i+W_j$. Further, the sequence may be composed of $W_i$ packets assigned to class $C_i$ and $W_j$ packets assigned to class $C_j$. The last time serveFlows executes in STEP 620 or STEP 624 before the condition set forth in STEP 512 is false, the subsequence serveFlows forwards may be different from a regular subsequence or an augmented subsequence because of the constraints imposed on the length and composition of the sequence, as discussed above.

As discussed above, the values stored in registers and counters (e.g., WRR, ASCC) are based on values of two weights, $W_i$ and $W_j$, corresponding to packets assigned to two classes of service, class $C_i$ and class $C_j$. Alternatively, in one or more embodiments of the invention, a greatest common divisor of the $W_i$ and $W_j$ may be obtained. In such embodiments, $W_i$ and $W_j$ may both be divided by the greatest common divisor of $W_i$ and $W_j$, the results stored in counters (e.g. WC 1 and WC 2). Subsequently, a sequence may be assembled according to the low jitter scheduler as discussed in reference to FIG. 15 and FIG. 17 based on the results stored in the counters instead of the original weights, $W_i$ and $W_j$. For example, if $W_i$=10 and $W_j$=4, then gcd($W_i$, $W_j$)=2 and WC 1 stores WC 1=$W_i$/gcd($W_i$, $W_j$)=10/2=5 and WC 2 stores WC 2=$W_j$/gcd($W_i$, $W_j$)=4/2=2. The low jitter scheduler will then assembling a sequence of length WC 1+WC 2=5+2=7. In such embodiments, the jitter of the two flows in the resulting sequence may be lower than the jitter of a resulting sequence assembled without initially dividing the two weights by the greatest common denominator of the two weights. In such embodiments, the greatest common divisor may be obtained by accessing a lookup table or by calculating the greatest common divisor directly.

In one or more embodiments of the invention, the WRR may be set to WRR=ceil($W_i/W_j$)=$\lceil W_i/W_j \rceil$ instead of WRR=floor($W_i/W_j$)=$\lfloor W_i/W_j \rfloor$, as discussed above in reference to FIG. 15 and FIG. 17. When WRR=ceil($W_i/W_j$)=$\lceil W_i/W_j \rceil$, regular subsequences may have one more packet from Flow i in comparison to when WRR=floor($W_i/W_j$)=$\lfloor W_i/W_j \rfloor$. Further, instead of having augmented subsequences as in the case that WRR=floor($W_i/W_j$)=$\lfloor W_i/W_j \rfloor$, when WRR=ceil($W_i/W_j$)=$\lceil W_i/W_j \rceil$, there exists decremented subsequences instead of augmented sequences. The decremented sequences include a number of packets assigned to class $C_i$ equal to WRR decremented by one (i.e., number of packets=WRR−1) and one packet assigned to class $C_j$. The resulting sequence may be composed of regular subsequences and decremented subsequences and may have the same jitter for each scheduled flow as the resulting sequence in the case that WRR=floor($W_i/W_j$)=$\lfloor W_i/W_j \rfloor$.

The low jitter scheduler in FIG. 17 may achieve a jitter as low as the low jitter scheduler in FIG. 15. However, the low jitter scheduler in FIG. 17 interleaves augmented subsequences between regular subsequences while the low jitter scheduler in FIG. 15 assembles all the augmented subsequences in the beginning and then assembles all the regular subsequences. In addition to calculating the interdeparture delay of a single packet assigned to a particular class of service, an interdeparture delay may also be calculated for a pair of packets assigned to a given class of service. For example, consider four packets A, B, C, and D, all from the same class, having the interdeparture delays of 3, 4, 3, and 4, respectively. This first set of interdeparture delays may be obtained by the scheduling algorithm in FIG. 17. The interdeparture delay of a pair of packets is the sum of their individual interdeparture delays of a particular class of service. Accordingly, pair {A, B} has an interdeparture delay of 3+4=7; pair {B, C} has an interdeparture delay of 4+3=7; pair {C, D} has an interdeparture delay of 3+4=7; and pair {D, A} has an interdeparture delay of 4+3=7.

Now consider four packets E, F, G, and H, all from the same class, having the interdeparture delays of 4, 4, 3, and 3, respectively. This second set of interdeparture delays may be obtained by the low jitter scheduler in FIG. 15. As discussed above, the interdeparture delay of a pair of packets is the sum of their individual interdeparture delays in a given flow. Accordingly, pair {E, F} has an interdeparture delay of 4+4=8; pair {F, G} has an interdeparture delay of 4+3=7; pair {G, H} has an interdeparture delay of 3+3=6; and pair {H, E} has an interdeparture delay of 3+4=7.

The calculated jitter is the same for both sets (i.e., {A, B, C, D} and {E, F, G, H}) when considering only the individual interdeparture delays of each packet. However, when considering the interdeparture delays of each pair of packets, the calculated jitter is 0 for the first set (i.e., {A, B, C, D}) and 0.5 for the second set (i.e., {E, F, G, H}). Accordingly, in one or more embodiments of the invention, the low jitter scheduler in FIG. 17 results in a lower jitter measurement than the low jitter scheduler in FIG. 15.

Figure 18:
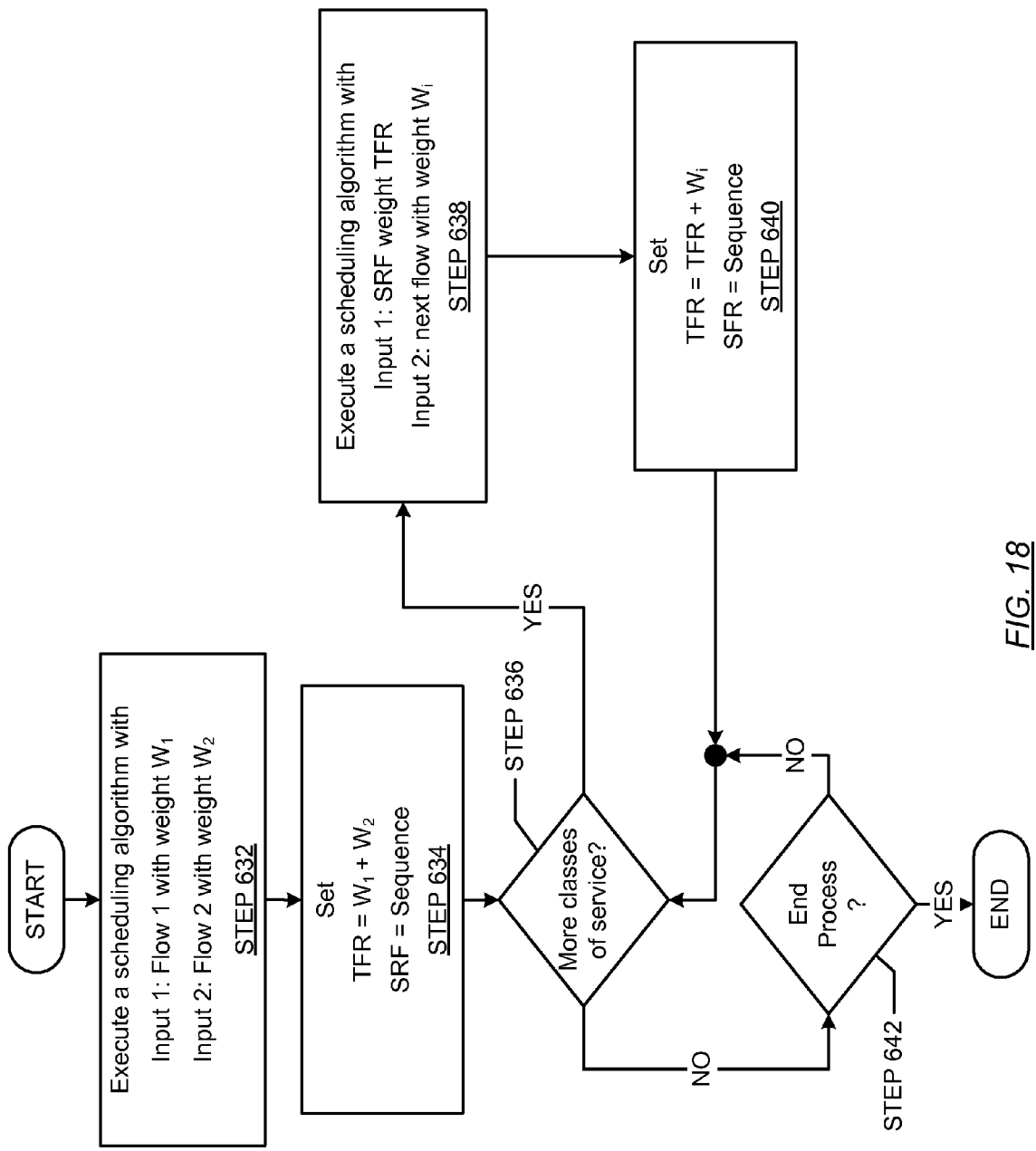

FIG. 18 shows a flowchart in accordance with one or more embodiments of the invention. The process shown in FIG. 18 may be an extension to the low jitter schedulers discussed above in reference to FIG. 15 and FIG. 17 to assemble and forward a sequence of packets for k flows having weights $W_1, W_2 \ldots W_k$, where k is greater than two.

In one or more embodiments of the invention, the process in FIG. 18 may set and modify the values of one or more counters (e.g., WC1, WC2, WRC, ASCC, DC). In one or more embodiments of the invention, the scheduling algorithm may store calculated values in registers (e.g., WRR, RR, ASRR, TWR) and register files (e.g., SRF).

Initially, the scheduling algorithm described in FIG. 15 or FIG. 17 is executed on two classes of services, class $C_1$ and class $C_2$ (STEP 632). In STEP 634, the value of the TWR is set to the total weight of class $C_1$ and class $C_2$, TWR=$W_1+W_2$, and the SRF is configured to store the instructions dictating the order in which the packets in ordered class packet queues corresponding to class $C_1$ and class $C_2$ are to be forwarded (i.e., the instructions are used to assemble the sequence of packets). In one of more embodiments of the invention, the sequence of packets may be stored in an internal queue.

In STEP 636, the scheduler determines whether there are more classes of service to schedule. If there are more classes of service to schedule, the process proceeds to STEP 638. Otherwise, if there are no more classes of service to schedule, the process proceeds to STEP 642.

In STEP 638, the low jitter scheduler described in FIG. 15 or FIG. 17 is executed on the sequence stored in the SRF with weight equal to the value of the TWR and a next flow to be scheduled with weight $W_i$. In other words, after scheduling the first pair of packet flows, the scheduler proceeds by scheduling the resulting sequence with another packet flow. For example, once the packet flows of class $C_1$ and class $C_2$ have been scheduled, the resulting sequence is scheduled with another packet flow of a different class (e.g. class $C_3$).

In STEP 640, the value of TWR is incremented by $W_i$. Further, the SRF is updated with the sequence resulting from the scheduling algorithm performed in STEP 638. After STEP 640, the process returns to STEP 636. The process of FIG. 18 may continuously repeat STEP 638 and STEP 640 until no more classes of service are left to be scheduled, as set forth in STEP 636. Accordingly, the scheduler recursively applies the low jitter scheduler in FIG. 15 or in FIG. 17 to its resulting sequence and another class of service to assemble a final sequence incorporating packets from all classes of service that were scheduled. Alternatively, execution of the process may end (i.e., STEP 642).

In one or more embodiments of the invention, additional packets from additional classes of service may arrive at the scheduler at the same time as any of the steps in FIG. 18 are being processed. Accordingly, the condition set forth in STEP 636 will switch from false to true and the scheduler will execute STEP 708 and STEP 640 with the new class of service as an input to the scheduling algorithm executed in STEP 638. Accordingly, packets from new class of service will be incorporated into the final resulting sequence as the new class of service arrive.

Figure 19C:
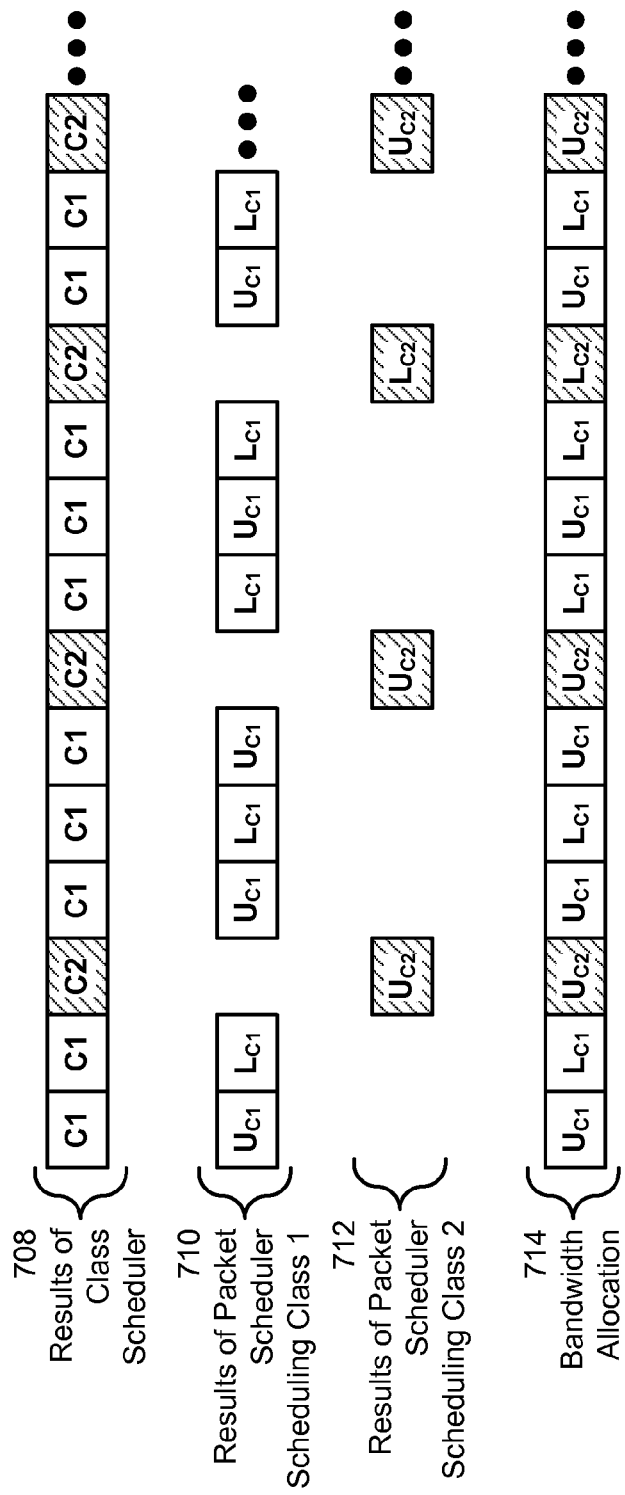

The following example is for explanatory purposes only and not intended to limit the scope of the invention. FIG. 19A-19C show an example for scheduling packets belonging to one of two different classes of service in accordance with one or more embodiments of the invention. Turning to FIG. 19A, as shown in the key for the example (702), class 1 is represented as C1 in the example, class 2 is represented as C2, U is an upstream packet and L is a local packet. Thus, $U_{C1}$ is an upstream packet from class 1, $U_{C2}$ is an upstream packet from class 2, $L_{C1}$ is a local packet from class 1, and $L_{C2}$ is a local packet from class 2. As shown in the example, each class has a separate set of counters and registers, denoted using subscripts in FIG. 19A. In the example, the local switch is the fourth switch in the daisy chain interconnect. Accordingly, there are three upstream sources to the local switch. Class 1 and class 2 each have three 3-bit USPCs (i.e., USPC X, USPC Y, USPC Z).

Turning to class 1, during the initialization process shown in FIG. 14, $USPC_{C1}$ X=5, $USPC_{C1}$ Y=3, $USPC_{C1}$ Z=7, and the $AUPC_{C1}$=15 before STEP 532 is executed. Accordingly, the initialization process sets the $UPWC_{C1}$=$UPWC_{C1}$ Register = $AUPC_{C1}$>>3=1, the initialization process sets the $UPC_{C1}$=$UPC_{C1}$ Register=$AUPC_{C1}$/gcd($AUPC_{C1}$, 8)=15/gcd (15,1)=15/1=15, and the initialization process sets the $LPC_{C1}$=$LPC_{C1}$ Register=8/gcd($AUPC_{C1}$, 8)=8/1=8. Now, the fairness protocol of FIG. 12 or FIG. 13 will service $UPWC_{C1}$=1 remote packets, decrease the $UPC_{C1}$ to 14, then it will service one local packet, decrement the $LPC_{C1}$ to 7, etc. until the $LPC_{C1}$ becomes 0. The resulting pattern of packets is: $U_{C1} L_{C1} U_{C1} L_{C1} U_{C1} L_{C1} U_{C1} L_{C1} U_{C1} L_{C1} U_{C1} L_{C1} U_{C1}$ $L_{C1} U_{C1} L_{C1} U_{C1} U_{C1} U_{C1} U_{C1} U_{C1} U_{C1} U_{C1}$. Accordingly, when the packet scheduling engine executes on class 1 packets, the packet scheduling engine forwards packets to the class scheduling engine in the order of $U_{C1} L_{C1} U_{C1} L_{C1} U_{C1}$ $L_{C1} U_{C1} L_{C1} U_{C1} L_{C1} U_{C1} L_{C1} U_{C1} L_{C1} U_{C1} L_{C1} U_{C1} U_{C1} U_{C1}$ $U_{C1} U_{C1} U_{C1} U_{C1}$.

Turning to class 2, during the initialization process shown in FIG. 14, $USPC_{C2}$ X=6, $USPC_{C2}$ Y=6, $USPC_{C2}$ Z=8, and the $AUPC_{C2}$=20 before STEP 532 is executed. Accordingly, the initialization process sets the $UPWC_{C2}$=$UPWC_{C2}$ Register = $AUPC_{C2}$>>3=2, the initialization process sets the $UPC_{C2}$=$UPC_{C2}$ Register=$AUPC_{C2}$/gcd($AUPC_{C2}$, 8)=20/gcd (20,8)=20/4=5, and the initialization process sets the $LPC_{C2}$=$LPC_{C2}$ Register=8/gcd($AUPC_{C2}$, 8)=8/4=2. Now, the fairness protocol of FIG. 12 or FIG. 13 will service $UPWC_{C2}$=2 remote packets, decrease the $UPC_{C2}$ to 3, then it will service one local packet, decrement the $LPC_{C2}$ to 1, etc. until the $LPC_{C2}$ becomes 0. The resulting pattern of packets is: $U_{C2} U_{C2} L_{C2} U_{C2} U_{C2} L_{C2} U_{C2}$. Accordingly, when the packet scheduling engine executes on class 2 packets, the packet scheduling engine forwards packets to the class scheduling engine in the order of $U_{C2} U_{C2} L_{C2} U_{C2} U_{C2} L_{C2} U_{C2}$.

FIG. 19B shows a continuation of the example (701) in one or more embodiments of the invention. Continuing with the example, consider the scenario in which the class scheduling engine implements a low jitter scheduler. As shown in the continuation of the example (701), the class scheduling engine processes class C1 having weight $W_{C1}=10$ and class C2 having weight $W_{C2}=4$. The scheduler sets the WRR to WRR=floor($W_{C1}/W_{C2}$)=$\lfloor W_{C1}/W_{C2} \rfloor$=2, the scheduler sets the RR to RR=$W_{C1}-W_{C2} \times$WRR=10−4×2=2, the scheduler sets the ASRR to ASRR=floor($W_{C2}$/RR)=2, and the scheduler sets the ASCC to ASCC=ceil($W_{C1}$/(WRR×ASCC+WRR+1))=ceil(10/(4+2+1))=ceil(10/7)=2. Further, the scheduler sets $WC_{C1}=W_{C1}=10$, $WC_{C2}=W_{C2}=4$, and the WRC=WRR=2. The class scheduling engine assembles and forwards a regular subsequence, which is C1 C1 C2. Subsequently, the class scheduling engine assembles a set of augmented subsequences with a cardinality equal to the ASCC=2, with each augmented subsequence being C1 C1 C1 C2. Subsequently, the class scheduling engine assembles and forwards one regular subsequence before the process terminates. The resulting allocation of packets sent to the downstream switch is the sequence: C1 C1 C2 C1 C1 C1 C2 C1 C1 C1 C2 C1 C1 C2 . . . . The inter departure delays of Class C1 for the resulting sequence are 1, 2, 1, 1, 2, 1, 1, 2, 1, and 2, while the inter departure delays of Class C2 for the resulting sequence 4, 4, 3, and 3. The jitter of Class C1 is 0.49, whereas the jitter of Class C2 is 0.50. Thus, the packets are forwarded as follows: $U_{C1} L_{C1} U_{C2} U_{C1} L_{C1} U_{C1} U_{C2} L_{C1} U_{C1} L_{C1} L_{C2} U_{C1} L_{C1} U_{C2}$ . . . .

Continuing with the example, FIG. 19C shows a graphical view of the example (706) of FIG. 19A and continued in FIG. 19B. Specifically, FIG. 19C shows a diagram of the results of the class scheduler (708), the results of the packet scheduler scheduling class 1 packets (710), the results of the packet scheduler scheduling class 2 packets (712), and the resulting bandwidth allocation (714). In the graphical view, each box represents a packet. The slanted fill in the boxes refer class 2 packets while no fill refers to class 1 packets. As shown in the graphical view within a particular class, local packets are inserted into the upstream packets at different insertion rates than other classes of service. In other words, the fairness protocol is implemented separately for each class of service. However, among different classes of service, the packets are scheduled according to the priority of the class of service assigned to the packet.

Figure 20:
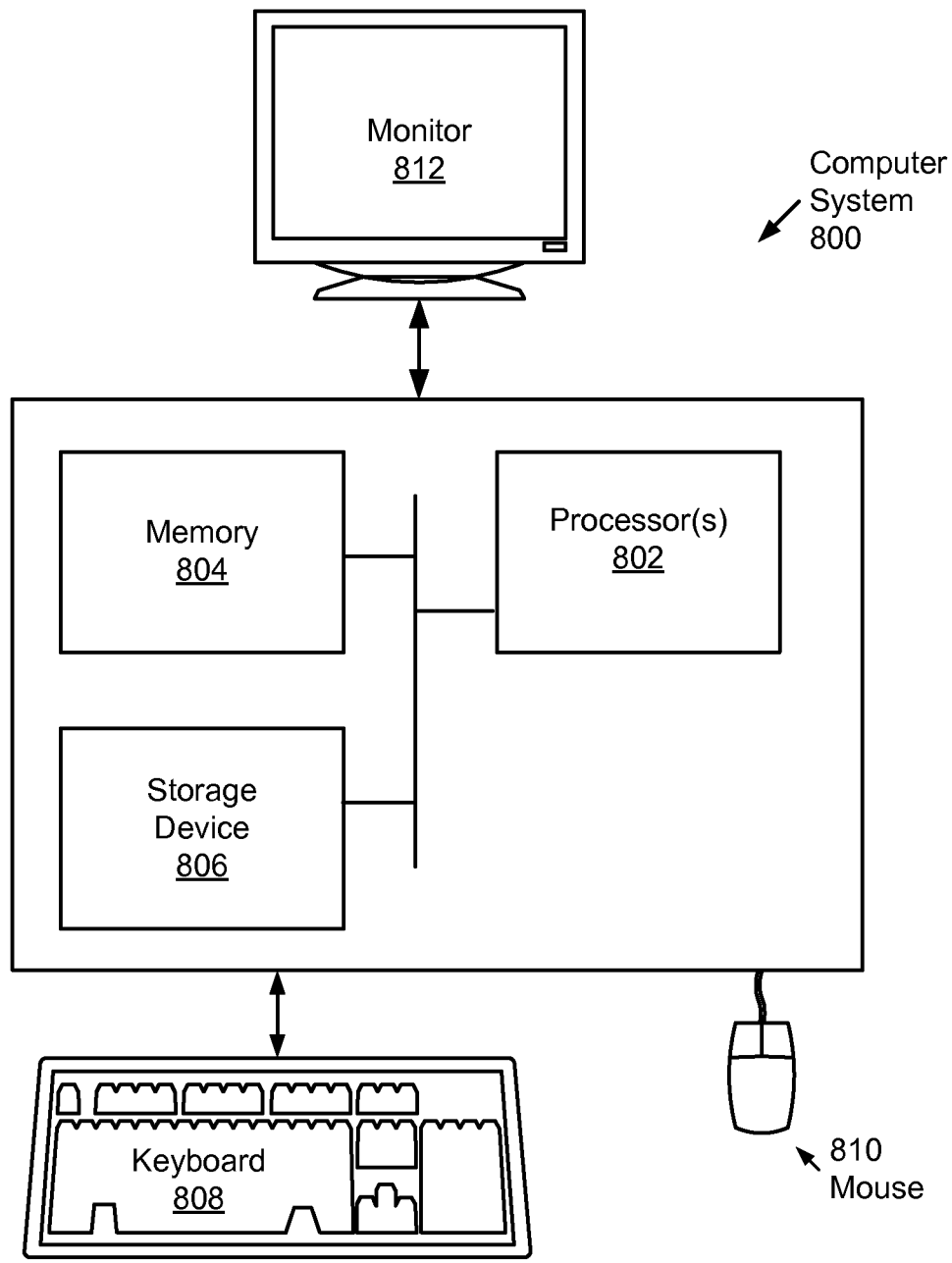
FIG. 20 shows a computer system in accordance with one or more embodiments of the invention.

Embodiments of the invention may be implemented in virtually any type of computer regardless of the platform being used. For example, as shown in FIG. 20, a computer system (800) includes one or more hardware processor(s) (802), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown). Further, the computer (800) may include output means, such as a monitor (812) (e.g., a liquid crystal display (LCD), a plasma display, or cathode ray tube (CRT) monitor). The computer system (800) may be connected to a network (not shown) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

One or more embodiments of the invention allow for processing packets assigned multiple different classes of service on a single chip. Furthermore, embodiments of the invention allow for implementing the fairness protocols separately for each different class of service. Thus, one class of service may, for example, have more upstream packet as compared to local packets than another class of service.

In the claims, ordinal numbers (e.g., first, second, third, etc.) are used to distinguish between different items. The ordinal numbers should not be construed as imposing any ordering of the items.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting packets, comprising:
   receiving, by a local switch of a plurality of switches each located on a single chip, a first plurality of upstream packets, each assigned a first class of service, from an upstream switch of the plurality of switches, wherein the plurality of switches are interconnected in a daisy chain topology;
   receiving, by the local switch, a first plurality of local packets, each assigned the first class of service, from a local device located on the chip;
   inserting, by the local switch according to a first insertion rate, at least one of the first plurality of local packets between a plurality of subsets of the first plurality of upstream packets to obtain a first ordered plurality of first class packets;
   receiving, by the local switch, a second plurality of upstream packets, each assigned a second class of service, from the upstream switch;
   receiving, by the local switch, a second plurality of local packets, each assigned the second class of service, from the local device;
   inserting, by the local switch according to a second insertion rate, at least one of the second plurality of local packets between plurality of subsets of the second plurality of upstream packets to obtain an ordered plurality of second class packets; and
   for each timeslot of a plurality of timeslots:
      selecting a selected class of service from a set comprising the first class of service and the second class of service; and
      forwarding, during the timeslot, a packet from the selected class of service to a downstream switch of the plurality of switches, wherein the packet from the selected class of service is obtained from a set comprising the first ordered plurality of first class packets and the ordered plurality of second class packets.

2. The method of claim 1, further comprising:
   receiving, by the local switch, a third plurality of upstream packets, each assigned the first class of service, from the upstream switch;
   receiving, by the local switch, a third plurality of local packets, each assigned the first class of service, from the local device;
   inserting, by the local switch according to a third insertion rate, at least one of the third plurality of local packets between subsets of the third plurality of upstream packets to obtain a second ordered plurality of first class packets;

forwarding a packet from at least one selected from a group consisting of the second ordered plurality of first class packets and the ordered plurality of second class packets.

3. The method of claim 1, wherein the selecting the selected class of service is performed using a low jitter scheduler.

4. The method of claim 3, wherein the low jitter scheduler generates a sequence of packets, and wherein generating the sequence of packets comprises:
   obtaining a weight ratio based on a first weight corresponding to the first class of service and a second weight corresponding to the second class of service;
   obtaining an augmented subsequence factor based on the first weight and the second weight;
   assembling a regular subsequence of packets using a first packet from the ordered plurality of second class packets and a first set of packets from the ordered plurality of first class packets, wherein the first set of packets has a cardinality equal to the weight ratio; and
   assembling an augmented subsequence of packets using a second packet from the ordered plurality of second class packets and a second set of packets from the ordered plurality of first class packets, wherein the second set of packets has a cardinality equal to the weight ratio plus one,
   wherein the sequence of packets comprises a set of regular subsequences comprising the regular subsequence and a set of augmented subsequences comprising the augmented subsequence,
   wherein the set of augmented subsequences has a cardinality based on the augmented subsequence factor,
   wherein the selecting the selected class of service is performed in the order of the sequence of packets.

5. The method of claim 4, wherein generating the sequence of packets is performed while selecting the selected class of service and while forwarding the packet.

6. The method of claim 4, wherein the sequence has a first number of packets from the ordered plurality of first class packets and a second number of packets from the ordered plurality of second class packets, and wherein the first number is the first weight and the second number is the second weight.

7. The method of claim 4, further comprising:
   calculating a first quotient by dividing the first weight by a greatest common divisor of the first weight and the second weight; and
   calculating a second quotient by dividing the second weight by the greatest common divisor of the first weight and the second weight,
   wherein the weight ratio is further based on the first quotient and the second quotient, and
   wherein the augmented subsequence factor is based on the first quotient and the second quotient.

8. The method of claim 4, further comprising:
   calculating a first remainder and a first quotient by dividing the first weight by the second weight; and
   calculating a first floor of the first quotient,
   wherein the weight ratio is the first floor.

9. The method of claim 8, further comprising:
   calculating a second quotient by dividing the second weight by the first remainder;
   calculating a second floor of the second quotient,
   wherein the augmented subsequence factor is the second floor,
   assembling a pattern of subsequences comprising one augmented subsequence and a subset of regular subsequences,
   wherein the subset of regular subsequences has a cardinality equaling the augmented subsequence factor minus one,
   wherein the pattern of subsequences comprises the augmented subsequence, and
   wherein the sequence comprises the pattern of subsequences.

10. The method of claim 8, wherein the cardinality of the set of augmented subsequences equals the augmented subsequence factor.

11. The method of claim 10, wherein the augmented subsequence factor equals the first remainder.

12. The method of claim 10, further comprising:
    calculating a second quotient by dividing the second weight by the first remainder;
    calculating a second floor of the second quotient;
    calculating a product of the weight ratio multiplied by the second floor;
    calculating a sum of the product and the weight ratio incremented by one;
    calculating a third quotient by dividing the first weight by the sum; and
    calculating a ceiling of the third quotient,
    wherein the augmented subsequence factor is the ceiling.

13. The method of claim 1, wherein the selecting the selected class of service is based on a weighted round robin scheme, and wherein the first class of service is assigned a greater weight than the second class of service.

14. A chip comprising a plurality of switches, the plurality of switches comprising:
    an upstream switch;
    a downstream switch; and
    a local switch, operatively connected to a local device and interposed between the upstream switch and the downstream switch, wherein the local switch comprises:
      a first class upper packet queue configured to store a first plurality of upstream packets, each assigned a first class of service, and received from the upstream switch;
      a first class local packet queue configured to store a first plurality of local packets, each assigned the first class of service, and received from the local device;
      a second class upper packet queue configured to store a second plurality of upstream packets, each assigned a second class of service, and received from the upstream switch;
      a second class local packet queue configured to store a second plurality of local packets, each assigned the second class of service, and received from the local device;
      a packet scheduling engine configured to:
        insert, according to a first insertion rate, at least one of the first plurality of local packets between a plurality of subsets of the first plurality of upstream packets to obtain an ordered plurality of first class packets; and
        insert, according to a second insertion rate, at least one of the second plurality of local packets between a plurality of subsets of the second plurality of upstream packets to obtain an ordered plurality of second class packets;

a class scheduling engine configured to, for each timeslot of a plurality of timeslots:
select a selected class of service from a set comprising the first class of service and the second class of service; and
forward, during the timeslot, a packet from the selected class of service to the downstream switch, wherein the packet is obtained from a set comprising the ordered plurality of first class packets and the ordered plurality of second class packets,
wherein the plurality of switches are interconnected in a daisy chain topology.

15. The chip of claim 14, further comprising:
a plurality of first class counters and registers, wherein the packet scheduling engine uses the plurality of first class counters and registers to insert the at least one of the first plurality of local packets between the plurality of subsets of the first plurality of upstream packets; and
a plurality of second class counters and registers, wherein the packet scheduling engine uses the plurality of second class counters and registers to insert the at least one of the second plurality of local packets between the plurality of subsets of the second plurality of upstream packets,
wherein the plurality of first class counters and registers are distinct from the plurality of second class counters and registers.

16. The chip of claim 15, wherein both of the plurality of first class counters and registers and the plurality of second class counters and registers comprise:
a local packet counter configured to store a number of forwarded local packets;
a plurality of upstream switch packet counters each associated with a corresponding upstream switch configured to store a number of forwarded upstream packets from the corresponding upstream switch;
an upstream packet counter configured to decrement in response to each forwarded upstream packet;
an upstream packet window counter configured to decrement in response to each forwarded upstream packet;
an aggregate upstream packet counter configured to store a total number of upstream packets;
an upstream packet counter register for storing a number to reset the upstream packet counter;
a local packet counter register for storing a number to reset the local packet counter; and
an upstream packet window counter register configured to store a corresponding insertion rate.

17. A chip comprising a plurality of switches, the plurality of switches comprising:
an upstream switch operatively connected to an upstream device;
a downstream switch operatively connected to a downstream device; and
a local switch, operatively connected to a local device and interposed between the upstream switch and the downstream switch, wherein the local switch comprises:
an upper packet queue configured to store a plurality of upstream packets, wherein the plurality of upstream packets comprises a plurality of first class upstream packets assigned a first class of service, and a plurality of second class upstream packets assigned a second class of service, and received from the upstream switch;
a first class local packet queue configured to store a first plurality of local packets, each assigned the first class of service, and received from the local device;
a second class local packet queue configured to store a second plurality of local packets, each assigned the second class of service, and received from the local device;
a packet scheduling engine configured to:
insert, according to a first insertion rate, at least one of the first plurality of local packets between a first plurality of subsets of the plurality of upstream packets to obtain an ordered plurality of first class packets; and
insert, according to a second insertion rate, at least one of the second plurality of local packets between a second plurality of subsets of the plurality of upstream packets to obtain an ordered plurality of second class packets;
a class scheduling engine configured to, for each of a plurality of timeslots:
select a selected class of service from a set comprising the first class of service and the second class of service; and
forward, during the timeslot, a packet from the selected class of service to the downstream switch, wherein the packet is obtained from a set comprising the ordered plurality of first class packets and the ordered plurality of second class packets,
wherein the plurality of switches are interconnected in a daisy chain topology.

18. The chip of claim 17, further comprising:
a plurality of first class counters and registers, wherein the packet scheduling engine uses the plurality of first class counters and registers to insert the at least one of the first plurality of local packets between the subsets of the first plurality of upstream packets; and
a plurality of second class counters and registers, wherein the packet scheduling engine uses the plurality of second class counters and registers to insert the at least one of the second plurality of local packets between the subsets of the second plurality of upstream packets,
wherein the plurality of first class counters and registers are distinct from the plurality of second class counters and registers.

19. The chip of claim 18, wherein both of the plurality of first class counters and registers and the plurality of second class counters and registers comprise:
a local packet counter configured to store a number of forwarded local packets;
a plurality of upstream switch packet counters each associated with a corresponding upstream switch configured to store a number of forwarded upstream packets from the corresponding upstream switch;
an upstream packet counter configured to decrement in response to each forwarded upstream packet;
an upstream packet window counter configured to decrement in response to each forwarded upstream packet;
an aggregate upstream packet counter configured to store a total number of upstream packets;
an upstream packet counter register for storing a number to reset the upstream packet counter; and
a local packet counter register for storing a number to reset the local packet counter; and
an upstream packet window counter register configured to store a corresponding insertion rate.

20. The chip of claim 17, wherein the class scheduling engine implements a low jitter scheduler.

* * * * *

UNITED STATES PATENT AND TRADEMARK OFFICE
CERTIFICATE OF CORRECTION

Page 1 of 1

PATENT NO. : 8,542,691 B2
APPLICATION NO. : 13/016924
DATED : September 24, 2013
INVENTOR(S) : Eberle et al.

It is certified that error appears in the above-identified patent and that said Letters Patent is hereby corrected as shown below:

On Title page 2, column 2, Item (56) under Other Publications, line 5, delete "Internetowrking" and insert -- Internetworking --, therefor.

In the Specification

In column 23, line 19, delete "0.50" and insert -- 0.50. --, therefor.

Signed and Sealed this
Twenty-fifth Day of February, 2014

Michelle K. Lee
*Deputy Director of the United States Patent and Trademark Office*